US007862420B2

(12) United States Patent
Peterson et al.

(10) Patent No.: US 7,862,420 B2

(45) **Date of Patent: *Jan. 4, 2011**

(54) GAMING DEVICE HAVING A SYMBOL ACCUMULATION GAME WITH A PHYSICAL PRIZE

(75) Inventors: Lance R. Peterson, Reno, NV (US); Karen M. Cregan, Reno, NV (US)

(73) Assignee: IGT, Reno, NV (US)

(*) Notice: Subject to any disclaimer, the term of this patent is extended or adjusted under 35 U.S.C. 154(b) by 1180 days.

This patent is subject to a terminal disclaimer.

(21) Appl. No.: 10/644,310

(22) Filed: Aug. 20, 2003

(65) Prior Publication Data

US 2005/0043082 A1 Feb. 24, 2005

(51) Int. Cl.
*A63F 13/00* (2006.01)

(52) U.S. Cl. ............................ 463/20; 463/21; 463/25; 463/42

(58) Field of Classification Search .................. 463/20, 463/21, 25, 42
See application file for complete search history.

(56) References Cited

U.S. PATENT DOCUMENTS

| | | | | | |
|---|---|---|---|---|---|
| 4,101,129 | A | * | 7/1978 | Cox | 463/20 |
| 4,184,683 | A | * | 1/1980 | Hooker | 273/143 R |
| 4,695,053 | A | | 9/1987 | Vazquez et al. | |
| 5,123,649 | A | * | 6/1992 | Tiberio | 273/143 R |
| 5,397,125 | A | | 3/1995 | Adams | |
| 5,580,309 | A | * | 12/1996 | Piechowiak et al. | 463/16 |
| 5,695,402 | A | * | 12/1997 | Stupak | 463/20 |
| 5,704,835 | A | * | 1/1998 | Dietz, II | 463/20 |
| 5,816,918 | A | | 10/1998 | Kelly et al. | |
| 5,833,537 | A | * | 11/1998 | Barrie | 463/21 |
| 5,941,772 | A | * | 8/1999 | Paige | 463/20 |
| 5,997,401 | A | * | 12/1999 | Crawford | 463/20 |
| 6,007,426 | A | | 12/1999 | Kelly et al. | |
| 6,014,594 | A | | 1/2000 | Heidel et al. | |
| 6,015,344 | A | | 1/2000 | Kelly et al. | |
| 6,033,307 | A | * | 3/2000 | Vancura | 463/20 |
| 6,062,980 | A | | 5/2000 | Luciano | |
| 6,068,553 | A | | 5/2000 | Parker | |
| 6,113,098 | A | | 9/2000 | Adams | |
| 6,135,884 | A | * | 10/2000 | Hedrick et al. | 463/20 |
| 6,186,894 | B1 | | 2/2001 | Mayeroff | |
| 6,203,430 | B1 | * | 3/2001 | Walker et al. | 463/20 |
| 6,224,483 | B1 | | 5/2001 | Mayeroff | |

(Continued)

OTHER PUBLICATIONS

Black Swan Advertisement written by IGT, published prior to 2001.

(Continued)

*Primary Examiner*—Peter DungBa Vo
*Assistant Examiner*—William H McCulloch
(74) *Attorney, Agent, or Firm*—K&L Gates LLP

(57) ABSTRACT

A gaming device including a free spins game having a plurality of reels with a plurality of symbols. The symbols include at least one prize symbol, where a physical prize is associated with the prize symbol. In one embodiment, the gaming device activates or spins the reels for a designated number of spins in a game. The gaming device spins the reels in the game and accumulates any prize symbols indicated on the reels. If the accumulated number of prize symbols reaches a designated number of prize symbols necessary to win the physical prize, the gaming device awards the physical prize to the player.

87 Claims, 14 Drawing Sheets

U.S. PATENT DOCUMENTS

| | | | | |
|---|---|---|---|---|
| 6,231,442 | B1 | 5/2001 | Mayeroff | |
| 6,251,013 | B1 * | 6/2001 | Bennett | 463/13 |
| 6,251,017 | B1 * | 6/2001 | Leason et al. | 463/42 |
| 6,319,127 | B1 * | 11/2001 | Walker et al. | 463/26 |
| 6,368,216 | B1 * | 4/2002 | Hedrick et al. | 463/20 |
| 6,375,570 | B1 * | 4/2002 | Poole | 463/31 |
| 6,464,581 | B1 * | 10/2002 | Yoseloff et al. | 463/20 |
| 6,485,367 | B1 * | 11/2002 | Joshi | 463/13 |
| 6,491,584 | B2 * | 12/2002 | Graham et al. | 463/25 |
| 6,572,471 | B1 | 6/2003 | Bennett | |
| 6,609,969 | B1 | 8/2003 | Luciano et al. | |
| 6,609,970 | B1 | 8/2003 | Luciano | |
| 6,609,978 | B1 | 8/2003 | Paulsen | |
| 6,663,105 | B1 * | 12/2003 | Sullivan et al. | 273/138.2 |
| 6,758,757 | B2 * | 7/2004 | Luciano et al. | 463/43 |
| 6,769,984 | B2 * | 8/2004 | Duhamel et al. | 463/20 |
| 6,773,345 | B2 * | 8/2004 | Walker et al. | 463/17 |
| 6,805,629 | B1 * | 10/2004 | Weiss | 463/16 |
| 6,843,720 | B2 | 1/2005 | Luciano et al. | |
| 6,899,626 | B1 | 5/2005 | Luciano et al. | |
| 6,913,532 | B2 | 7/2005 | Baerlocher et al. | |
| 6,955,600 | B2 * | 10/2005 | Glavich et al. | 463/20 |
| 7,056,213 | B2 | 6/2006 | Ching et al. | |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 7,218,991 | B2 | 5/2007 | Walker et al. | |
| 7,238,110 | B2 | 7/2007 | Glavich et al. | |
| 7,258,611 | B2 * | 8/2007 | Bigelow et al. | 463/25 |
| 7,494,413 | B2 * | 2/2009 | Singer et al. | 463/20 |
| 7,604,540 | B2 * | 10/2009 | Olive | 463/27 |
| 2001/0009865 | A1 * | 7/2001 | Demar et al. | 463/20 |
| 2002/0010017 | A1 * | 1/2002 | Bennett | 463/20 |
| 2002/0094861 | A1 * | 7/2002 | Seelig et al. | 463/20 |
| 2003/0050111 | A1 | 3/2003 | Saffari | |
| 2003/0060264 | A1 | 3/2003 | Chilton et al. | |
| 2003/0199320 | A1 | 10/2003 | Nguyen | |
| 2003/0220138 | A1 * | 11/2003 | Walker et al. | 463/25 |
| 2005/0075163 | A1 | 4/2005 | Cuddy et al. | |
| 2005/0233801 | A1 | 10/2005 | Baerlocher et al. | |
| 2006/0004489 | A1 | 1/2006 | Weiss | |
| 2006/0009284 | A1 * | 1/2006 | Schwartz et al. | 463/30 |
| 2006/0068884 | A1 | 3/2006 | Baerlocher et al. | |
| 2006/0068885 | A1 | 3/2006 | Cregan et al. | |
| 2007/0010316 | A1 | 1/2007 | Baerlocher et al. | |
| 2007/0021175 | A1 | 1/2007 | Rodgers et al. | |
| 2007/0021188 | A1 | 1/2007 | Rodgers et al. | |
| 2007/0026916 | A1 * | 2/2007 | Juds et al. | 463/1 |
| 2007/0060243 | A1 * | 3/2007 | Gomez et al. | 463/16 |

OTHER PUBLICATIONS

Wild Bear Salmon Run Advertisement written by IGT, published in 2003.

Arcade Planet Publication printed from http://www.arcadeplanet.com/coin_merit_pzone.htm and http://www.arcadeplanet.com/images/vms.jpg on Mar. 31, 2004.

Raining Diamonds Advertisement published by Sierra Design Group in 2001.

Gold Exchange Advertisement published by Sierra Design Group prior to Aug. 2003.

* cited by examiner

GAMING DEVICE HAVING A SYMBOL ACCUMULATION GAME WITH A PHYSICAL PRIZE

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible for players. Providing a wagering game in which a player has an opportunity to win potentially large awards or credits is one way to enhance player enjoyment and excitement. Another way to enhance player enjoyment and excitement is to provide a player with the potential to win a physical prize in a wagering game.

Currently, gaming machines or devices provide wagering games such as slot games wherein a player has one or more opportunities to obtain a winning symbol combination on mechanical or video reels. The winning symbol combination may be along the same payline or on different paylines (known as a scatter pay). If a winning symbol combination is indicated in the game, the gaming machine provides an award or awards associated with any of the generated winning symbol combinations to the player.

Gaming devices that increase the opportunities to obtain awards and increase the size of the awards are desirable. Additionally, gaming devices that provide different types of awards such as physical prizes are also desirable. Therefore, to increase player enjoyment and excitement, it is desirable to provide new games for gaming devices.

SUMMARY OF THE INVENTION

The present invention provides a gaming device and specifically, a gaming device that enables players to obtain unique awards or prizes such as physical prizes in a game or series of games. For purposes of this application, the term "physical prize" includes non-monetary physical prizes. In operation, the gaming device designates a number of prize symbols, which must be accumulated to obtain the physical prize. If the designated number of prize symbols are accumulated, the gaming device awards the physical prize to the player.

In one embodiment, the gaming device provides a physical prize to the player when a designated number of prize symbols are accumulated in a free spins mode or a plurality or series of free spin games. For purposes of this application, one or a plurality of free spin games are referred to herein as a free spins game. In this embodiment, the gaming device displays a plurality of reels having a plurality of symbols in a primary game. The symbols include at least one prize symbol. In one embodiment, the prize symbol represents the physical prize such as a watch, bicycle, car or boat and includes an image which represents the particular physical prize. The gaming device or player spins or activates the reels for an initial number of activations (such as one activation) in the primary game. If a triggering event occurs in the primary game, the gaming device initiates the free spins mode or game and provides a designated number of free spins to the player. The gaming device or player spins the reels in the free spins mode and accumulates any prize symbols indicated on the reels using the free spins. In one embodiment, the player accumulates prize symbols indicated on any of the reels. In another embodiment, the player accumulates prize symbols indicated on a designated payline or paylines associated with the reels.

The gaming device or player continues to spin or activate the reels in the free spins mode until there are no free spins or free activations remaining or until the accumulated number of prize symbols indicated on the reels in the free spins achieves the designated number of prize symbols needed to obtain the physical prize. If the accumulated number of prize symbols achieves the designated number of prize symbols, the gaming device awards the physical prize associated with the prize symbol to the player. In such a case, the primary game may end or the gaming device may provide any remaining free spins to the player for use in the primary game or may allow the player to continue free spins to try for another physical prize.

The physical prize may be provided to the player at the gaming device location or at a remote location. In one embodiment, the gaming device generates a prize code on a ticket, receipt or other suitable medium when the gaming device awards a physical prize to the player in a game. The code on the ticket or receipt enables the player to claim the physical prize at some predetermined location inside the gaming establishment or outside the gaming establishment such as in a store, warehouse or other suitable redemption location. The code or information on the ticket or receipt may also be entered into a database via a telephone line, internet connection or other suitable communication medium. The physical prize can be delivered to the player via a suitable mail or courier service. In an alternative embodiment, the gaming machine itself dispenses the physical prize to the player.

If the accumulated number of prize symbols does not achieve or reach the designated number of prize symbols, the player receives any awards obtained in the free spins mode or game and returns to the primary game.

In one embodiment, the designated number of prize symbols needed to be accumulated to obtain a physical prize in the free spins mode or game is greater than the number of prize symbols that can be possibly accumulated in the initial free spins game or in the initial number of spins in the free spins game. Therefore in this embodiment, the player must obtain at least one re-trigger of the reels such as a free spin or free activation (i.e., another triggering event) to have an opportunity to obtain or accumulate the designated number of prize symbols in the game. In one embodiment, the triggering event may be a reactivation, re-spin or re-trigger symbol indicated on the reels. In another embodiment, the triggering event is a combination of symbols indicated on the reels. It should be appreciated that the triggering event may be any suitable triggering event. If the player does not obtain a triggering event in the game, the player will not, in this embodiment, be able to obtain or accumulate the designated number of prize symbols in the game and therefore will not obtain the physical prize.

In another embodiment, the designated number of prize symbols are accumulated over a plurality of separately triggered games. In one such embodiment, the designated number of prize symbols are accumulated over a plurality of free spins games associated with a plurality of primary games. Initially, the gaming device designates a number of prize symbols to be accumulated to win a physical prize in the games. In each primary game, the gaming device provides a spin or spins of the reels based on a wager made by a player. Upon a triggering event in each primary game, the gaming device initiates a free spins mode or free spins game and provides a designated number of free spins to the player. The gaming device or player then spins or activates the reels for a designated number of free spins in each of the free spin games. In this embodiment, any prize symbols indicated on the reels in the free spin games are accumulated by the player (the prize symbols are not accumulated in the primary game or games, and therefore, if the triggering event does not occur in the primary game, the player does not accumulate any prize symbols). If the accumulated number of prize symbols does not reach or equal the designated number of prize symbols in any one game, the accumulated number of prize symbols is maintained, held or saved for a designated number of subsequent free spins games, such as one or more free spins games triggered for instance in another primary game. If the accumulated number of prize symbols does not reach the designated number of prize symbols necessary to be accumulated to win the physical prize and the designated number of free spins games has been reached or played, the gaming device resets the accumulated number of prize symbols to zero. It should be appreciated that the accumulated number of prize symbols may be reset to any suitable number.

In another embodiment, the gaming device designates a number of prize symbols necessary to be accumulated over a plurality of primary games. The gaming device or player spins the reels to accumulate any prize symbols indicated on the reels in each primary game. The accumulated prize symbols in each of the primary games are held or saved for a designated number of primary games. The gaming device awards the physical prize to the player if the accumulated number of prize symbols reaches the designated number of prize symbols necessary to be accumulated to win the physical prize in that number of plays of the primary game. It should be appreciated that the prize symbols may be accumulated in a primary game, a secondary game, a free spins game or any combination of games therein.

In one embodiment, the gaming device resets the accumulated number of prize symbols to zero when there are no activations remaining in a game such as a primary game or free spins game. In another embodiment, the gaming device resets the accumulated prize symbols to zero after a randomly determined or predetermined number of games. It should be appreciated that the gaming device may reset the accumulated prize symbols to any suitable number such as a predetermined number or randomly determined number of prize symbols. It should also be appreciated that the gaming device may reset the prize symbols after each game, a random number of games, a pre-determined number of games or any suitable number of games.

In one embodiment, the gaming device awards one physical prize to the player when the designated number of prize symbols are accumulated on the reels. In another embodiment, the gaming device awards one physical prize from a plurality of physical prizes. In this embodiment, the physical prizes may be the same style of physical prize, such as watches, but have different values. In one such embodiment, the processor may randomly determine the prize based on equally or unequally weighted probabilities. The physical prizes may also be different types of physical prizes such as a watch, a car, a television and a boat. In a further embodiment, the gaming device enables the player to pick one physical prize from a plurality of physical prizes when the designated number of prize symbols are accumulated.

In another embodiment, the reels in a game include a plurality of different prize symbols. In this embodiment, each of the different prize symbols is associated with a different physical prize or the same types of physical prizes with different values. The processor designates the number of prize symbols to be accumulated in a game to obtain each of the physical prizes. The designated numbers of prize symbols may be the same or different. The gaming device or player then spins or activates the reels in the game. When the accumulated number of prize symbols achieves or reaches the designated number of prize symbols associated with one of the physical prizes, the gaming device awards that physical prize to the player. In one embodiment, the physical prizes are weighted such that a greater number of prize symbols must be accumulated for the more desirable or valuable physical prizes. In this embodiment, the accumulation prize symbols for both physical prizes can be displayed to the player.

In a further embodiment, the present invention is employed in a card game. The card game includes a plurality of cards including symbols where at least one of the symbols includes a prize symbol. The gaming device designates a number of prize symbols to be accumulated in the game as described above, and deals card hands such as poker hands to the player. The player accumulates any prize symbols indicated on the player cards in the game. When the accumulated number of prize symbols on the cards reaches the designated number of prize symbols to be accumulated in the game, the gaming device provides the physical prize to the player.

It is therefore an advantage of the present invention to provide a gaming device that is operable to provide a physical prize to a player in a game.

A further advantage of the present invention is to provide a gaming device that is operable to provide several different types of physical prizes in a game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
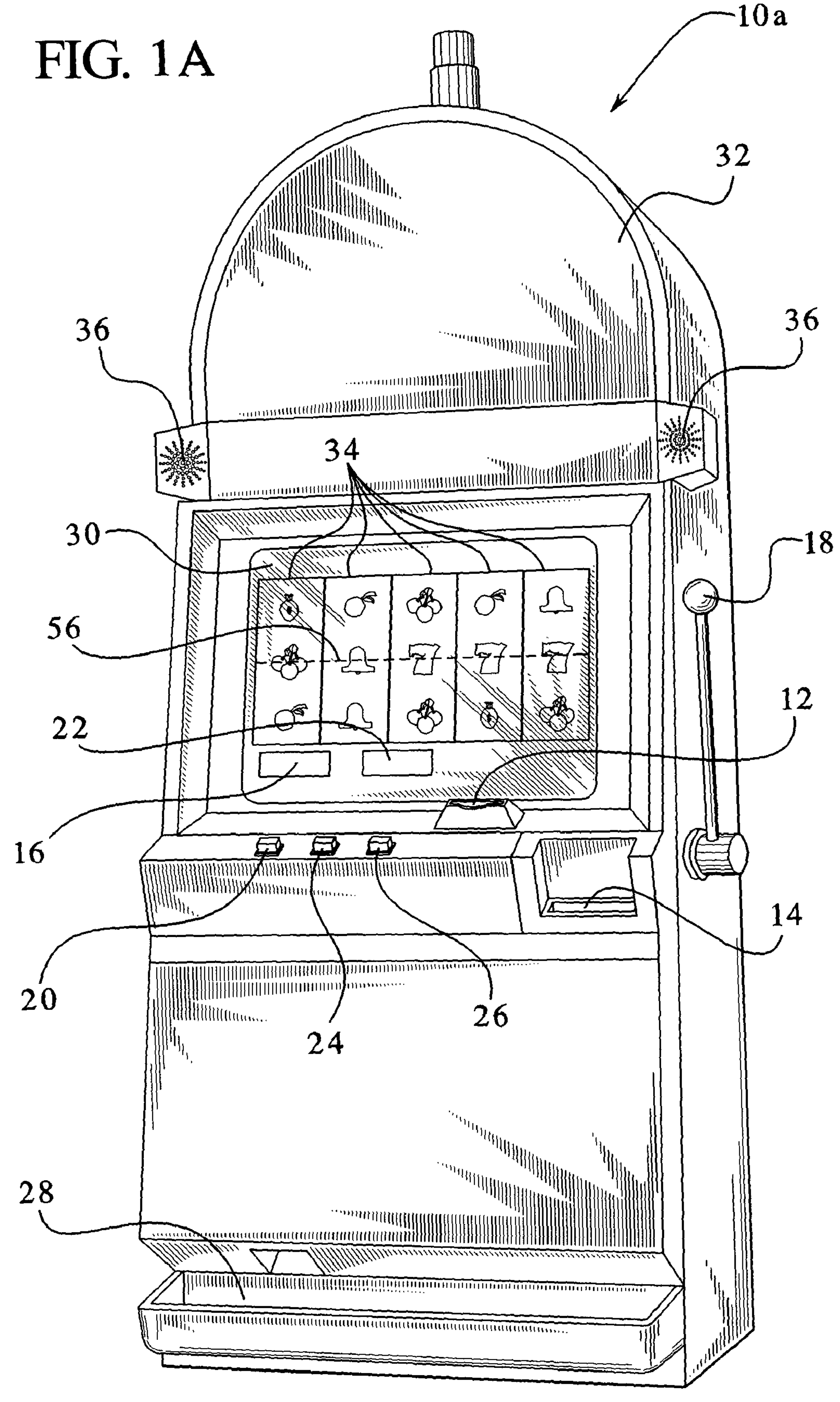
FIG. 1A is a front perspective view of one embodiment of the gaming device of the present invention.
Figure 1B:
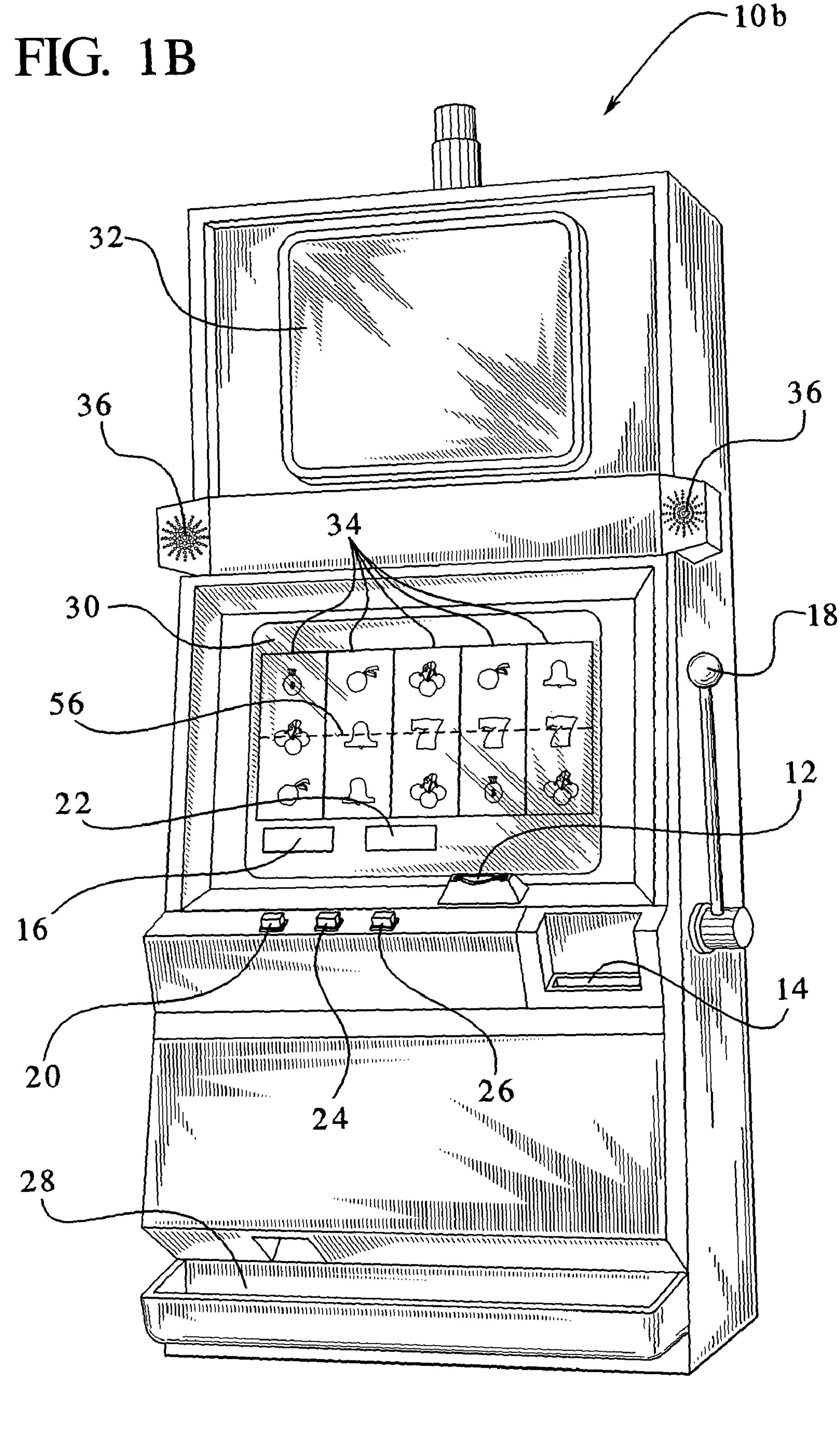
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment, a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B.

Gaming device 10 can also be implemented as a program code stored in a detachable cartridge for operating a handheld video game device. Also, gaming device 10 can be implemented as a program code stored on a disk or other memory device which a player can use in a desktop or laptop personal computer or other computerized platform. In these embodiments, the gaming device generates a prize code or a receipt or other suitable physical prize identifier when the gaming device awards a physical prize to a player in a game. The code or the receipt enables the player to claim the physical prize at a predetermined location such as a store, warehouse or other suitable redemption location. The code or information on the receipt may also be entered into a database via a telephone line, internet connection or other suitable communication medium. The physical prize is then delivered to the player as described above.

Gaming device 10 can incorporate any primary or base game such as slot, blackjack, poker or keno, any secondary or bonus triggering events and any suitable bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
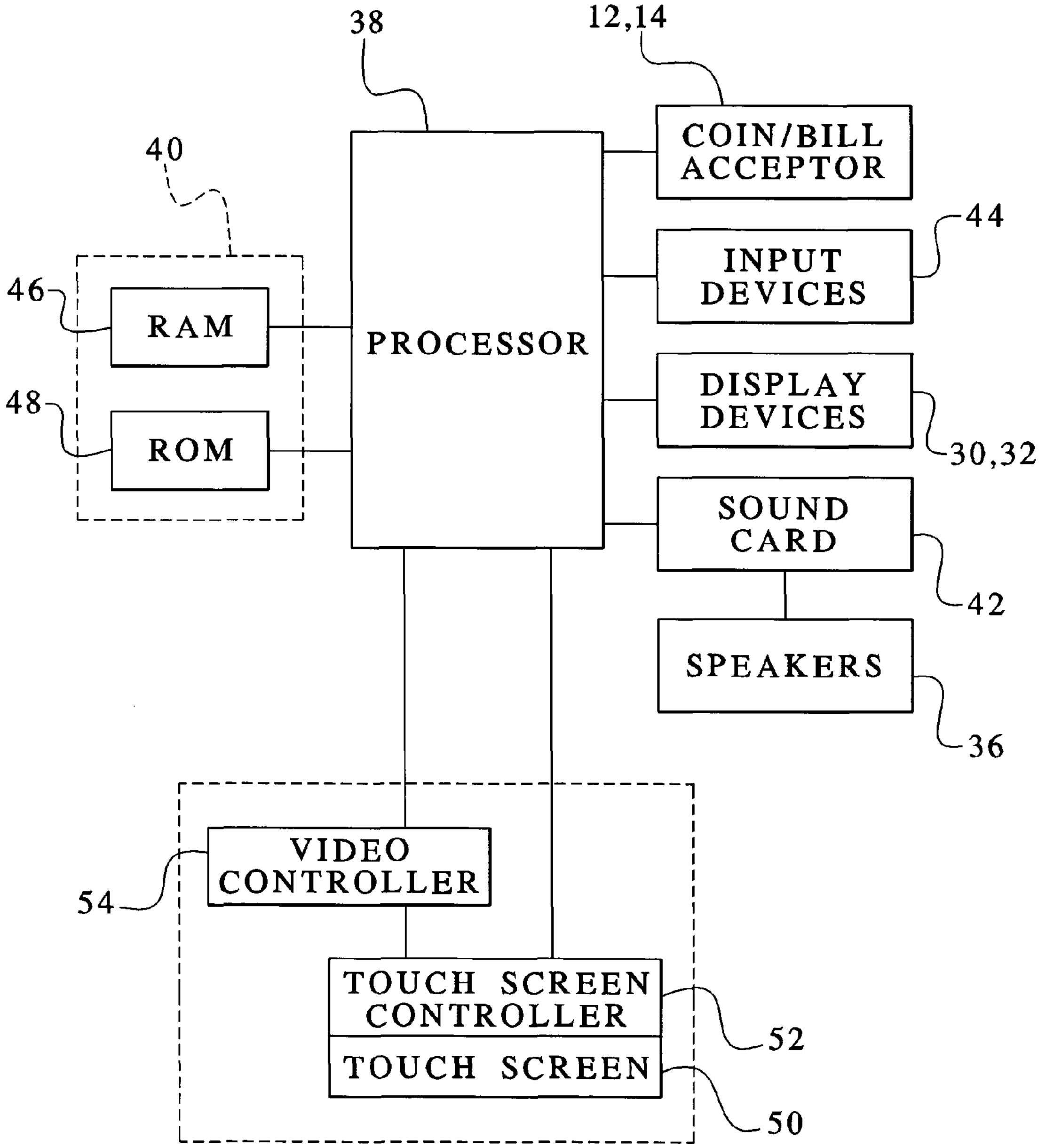
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. Preferably, the qualifying condition is a predetermined combination of indicia appearing on one or more of a plurality of the reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof. In one embodiment, the present invention is employed in a bonus or secondary game triggered in a primary or base game.

Symbol Accumulation Game

The present invention provides a gaming device and specifically, a gaming device that enables players to obtain physical prizes.

Figure 3:
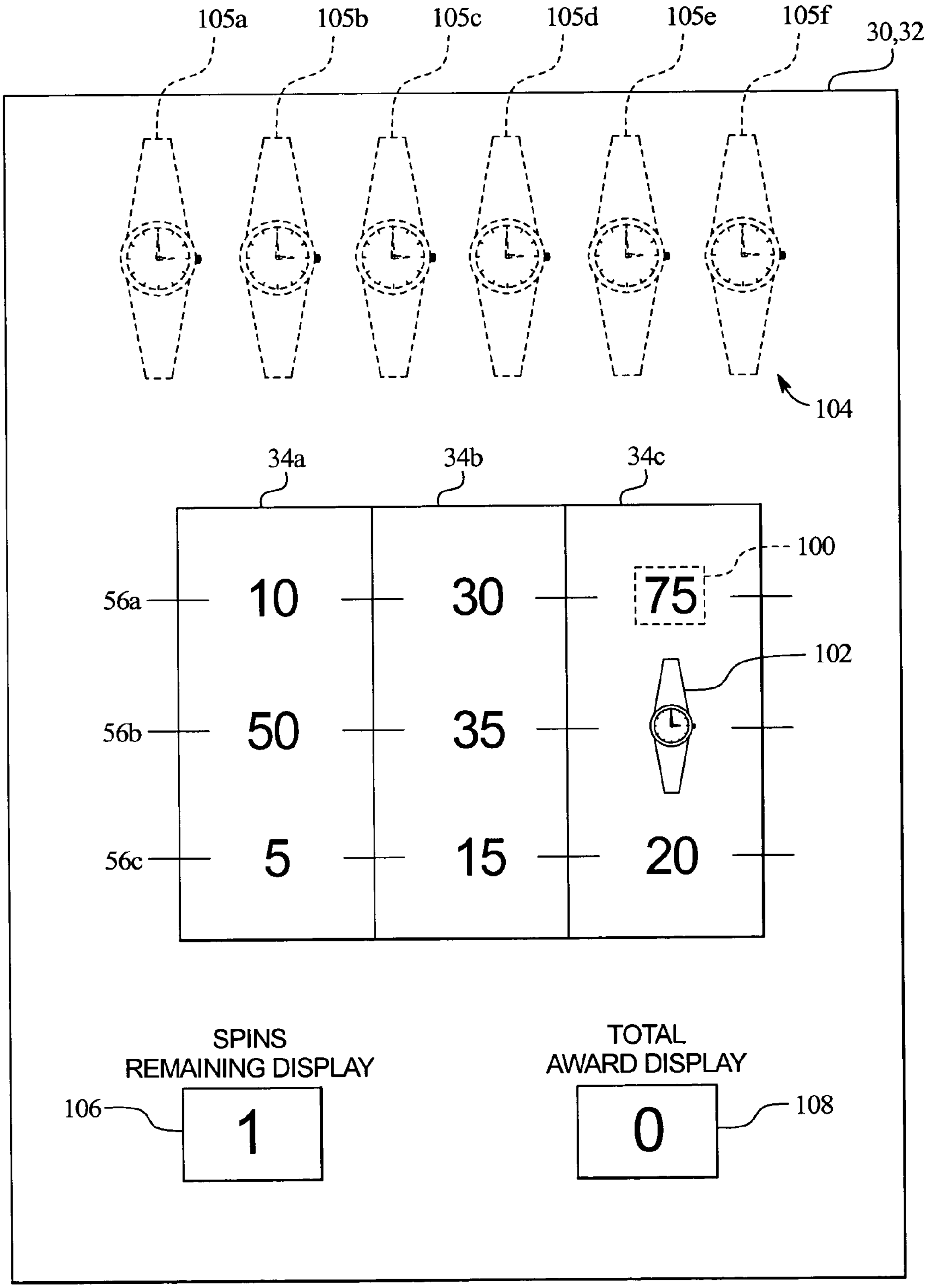
FIG. 3 is an enlarged elevation view of one embodiment of the gaming device of the present invention.

Referring now to FIG. 3, one embodiment of the gaming device 10 includes a plurality of reels 34*a*, 34*b* and 34*c*, which are displayed to a player in a primary game. In FIG. 3, the gaming device displays three reels 34*a*, 34*b* and 34*c*. However, it should be appreciated that any suitable number of reels may be employed in the game. The reels include a plurality of symbols 100, which include at least one prize symbol 102. A physical prize (not shown) such as a watch or other suitable physical prize is associated with the prize symbol 102. In the embodiment illustrated in FIG. 3, the symbols 100 include numbers or values. It should be appreciated however, that the symbols 100 may be numbers, letters, characters or any suitable symbols or images. Similarly, the prize symbol 102 may be any suitable symbol, character or image. In one example shown in FIG. 3, the prize symbol 102 represents an image of a watch, which is the physical prize for this game. The physical prize associated with the prize symbol 102 can include any suitable physical prize such as watches, bicycles, cars and boats.

In the illustrated embodiment, at least one payline is associated with the reels such that the symbols are indicated on one or more designated paylines. In FIG. 3, three paylines 56*a*, 56*b* and 56*c* are associated with the reels 34*a*, 34*b* and 34*c*. It should be appreciated, however, that any suitable number of paylines may be associated with the reels.

The gaming device also includes a prize symbol display 104, which displays and indicates the accumulated number of prize symbols. In one embodiment, the prize symbol display 104 includes one or more prize symbol indicators 105*a*, 105*b*, 105*c*, 105*d*, 105*e* and 105*f*. The number of prize symbol indicators equals the designated number of prize symbols that must be accumulated to obtain the physical prize. The prize symbol indicators are highlighted when prize symbols are indicated on the reels. For example, if two prize symbols are indicated on the reels after a spin, two of the prize symbol indicators are highlighted to show that the player has accumulated two prize symbols. In one embodiment, at least one illumination device (not shown) operates with the prize symbol indicators. The illumination device illuminates or highlights one or more of the prize symbol indicators to indicate the number of prize symbols indicated on the reels. In another embodiment, the gaming device includes a plurality of illumination devices where at least one illumination device is connected to each of the prize symbol indicators. It should be appreciated that any suitable highlighting or indicating method may be employed to highlight or indicate the prize symbol indicators. Additionally, the prize symbol indicators include symbols which represent images of the prize symbol (i.e., the physical prize). It should be appreciated that the prize symbol indicators may be any suitable symbol, character, number, letter or image.

In one embodiment, the gaming device also includes a spins remaining display 106 which indicates the number of spins or activations remaining in a game. In addition, a total award display 108 indicates the total award accumulated by a player in a game. The total award, if any, displayed by the total award display 108 at the end of the game is the total award provided to the player for the game.

In one embodiment, the present invention is employed in a free spins mode or free spins game upon the occurrence of a triggering event in a primary game or other suitable game. The triggering event may be any suitable triggering event such as a specific symbol or combination of symbols occurring on the reels. The processor designates a number of prize symbols 102 to be accumulated on the reels in the free spins game to obtain a physical prize in that game. The designated number of prize symbols may be randomly determined, predetermined or determined according to any suitable determination method. The number of prize symbol indicators 105 in the prize symbol display 104 is then set to equal the designated number of prize symbols to be accumulated in the free spins game. The prize symbol indicators 105 therefore enable a player to determine how many prize symbols must be indicated on the reels to win the physical prize at any point in the free spins game.

The processor also designates a number of spins or activations of the reels at the beginning of the primary game. The number of spins may be randomly determined, predetermined, based on a wager made by a player or determined in any suitable manner. The number of spins provided to the player is then indicated in the spins remaining display 106. In one embodiment, the number of spins of the reels decreases by one for each spin of the reels in the game. It should be appreciated that the number of spins may decrease by a random amount, predetermined amount or any suitable amount desired by the game implementor.

In a game, the gaming device or player activates or spins the reels for the designated number of spins in the primary game. If a triggering event occurs in one of the spins of the reels in the primary game, the gaming device initiates the free spins game. The gaming device then provides the player with the designated number of free spins in the free spins game. During the free spins of the reels, the gaming device provides any awards associated with the symbols 100 or combination of the symbols indicated on the reels. The gaming device also accumulates any prize symbols 102 that are indicated on the reels in the free spins game. When one or more of the prize symbols 102 are indicated on the reels, a prize symbol indicator 105 is highlighted or illuminated in the prize symbol display 104 to indicate the total number of prize symbols accumulated by the player in the game. In one embodiment, a prize symbol indicator 105 is highlighted or illuminated for each prize symbol 102 indicated on the reels in the game. In another embodiment, a predetermined number of prize symbol indicators are highlighted for each prize symbol indicated on the reels in the game. This may be predetermined, randomly determined, or determined based on another suitable factor such as the player's wager amount. It should be appreciated that any suitable number of prize symbol indicators may be highlighted or illuminated for each prize symbol indicated on the reels in the game.

If the total accumulated number of prize symbols achieves or reaches the designated number of prize symbols to be accumulated in the free spins game, the gaming device awards the physical prize associated with prize symbol 102 to the player. In such a case, the game could end or the gaming device could provide the remaining number of free spins indicated in the spins remaining display 106 to the player.

If the player does not accumulate the designated number of prize symbols 102 to obtain the physical prize in the free spins game, the game ends and the gaming device provides the player with the total award indicated in the total award display 108. The gaming device then resets the prize display 104 to zero to indicate that the number of accumulated prize symbols is zero. The gaming device continues to reset the prize symbol display 104 after each free spins game until a player accumulates the designated number of prize symbols 102 on the reels 34 in the free spins game. It should be appreciated that the prize symbols indicators 105 in the prize symbol display may be reset to zero, a predetermined number, a randomly determined number or any suitable number.

Although the present invention is employed in a free spins mode or free spins game, it should be appreciated that it may be employed in a primary game or base game, secondary game or bonus game or any suitable game.

Referring now to FIGS. 4A through 4E, an example of the embodiment of FIG. 3 is illustrated where the gaming device provides a player with four free activations or free spins of the reels 34 in a free spins mode or free spins game as indicated by the spins remaining display 106. In this example, the physical prize is a watch (not shown) and the prize symbol 102 represents an image of the physical prize (i.e., watch). Also, an award is associated with each of the symbols 100, which are numbers. The award equals the value of the number (i.e., symbol) indicated on payline 56*b*. In the game, the gaming device designates the number of prize symbols 102 to be accumulated in the game to obtain the physical prize (i.e., the watch), which is six. The prize symbol 102 may be indicated on any of the paylines associated with the reels in the free spins game. Therefore, the player must accumulate six prize symbols 102 or watch symbols 102 on any of the reels in the free spins game to receive the physical prize (i.e., a watch) associated with the prize symbol 102. The designated number of prize symbols six, is represented by six prize symbol indicators 105*a*, 105*b*, 105*c*, 105*d*, 105*e* and 105*f* displayed at the top of the display device. In the game, each time a prize symbol 102 is indicated on the reels 34, a prize symbol indicator 105 is highlighted or illuminated at the top of the display 30 or 32. When the designated number of prize symbols 102 are indicated on the reels in the free spins game, the gaming device provides the physical prize associated with the prize symbol 102 to the player.

Figure 4A:
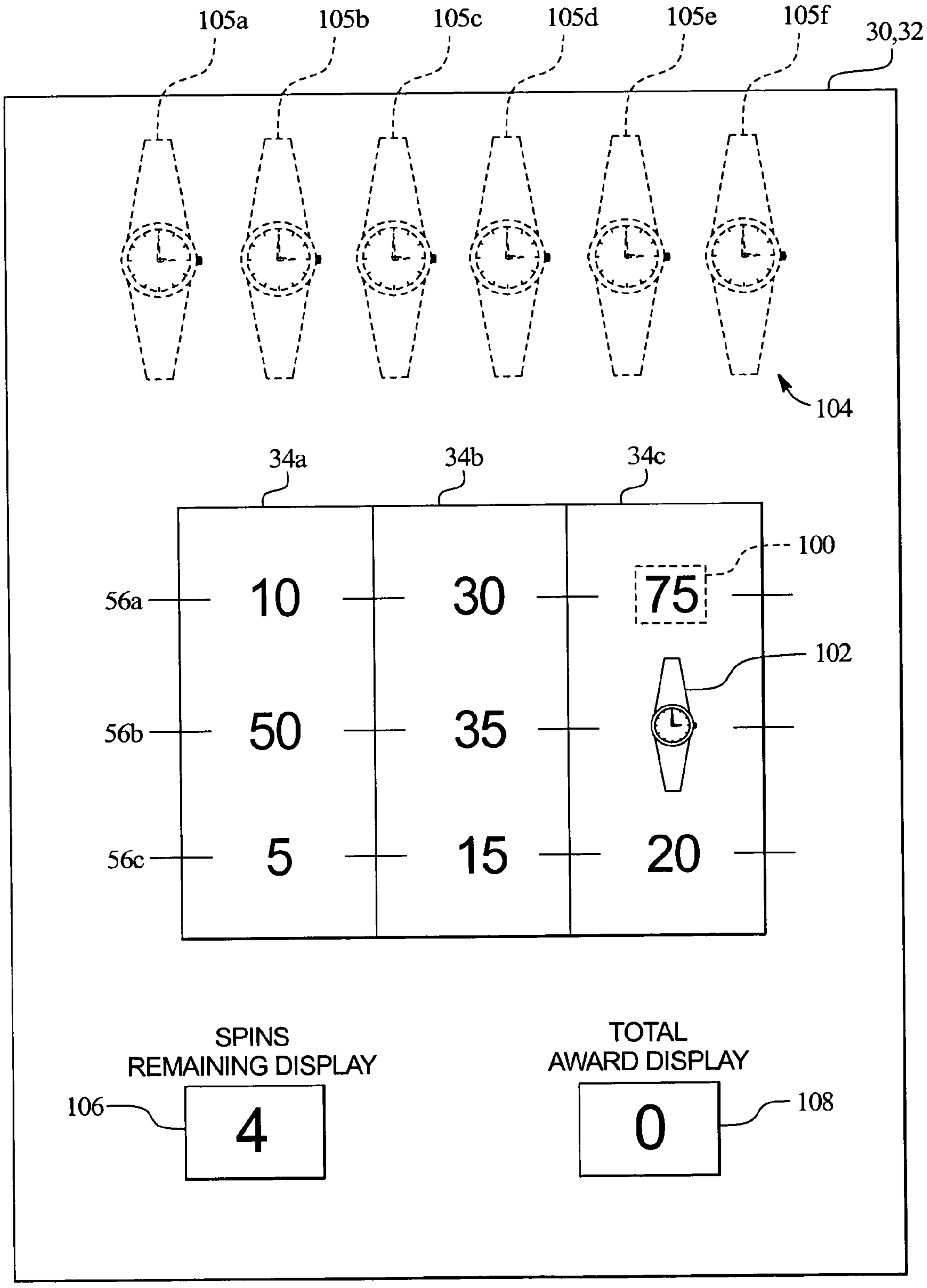
FIGS. 4A, 4B, 4C, 4D and 4E are enlarged elevation views of an example of the embodiment of FIG. 3.
Figure 4B:
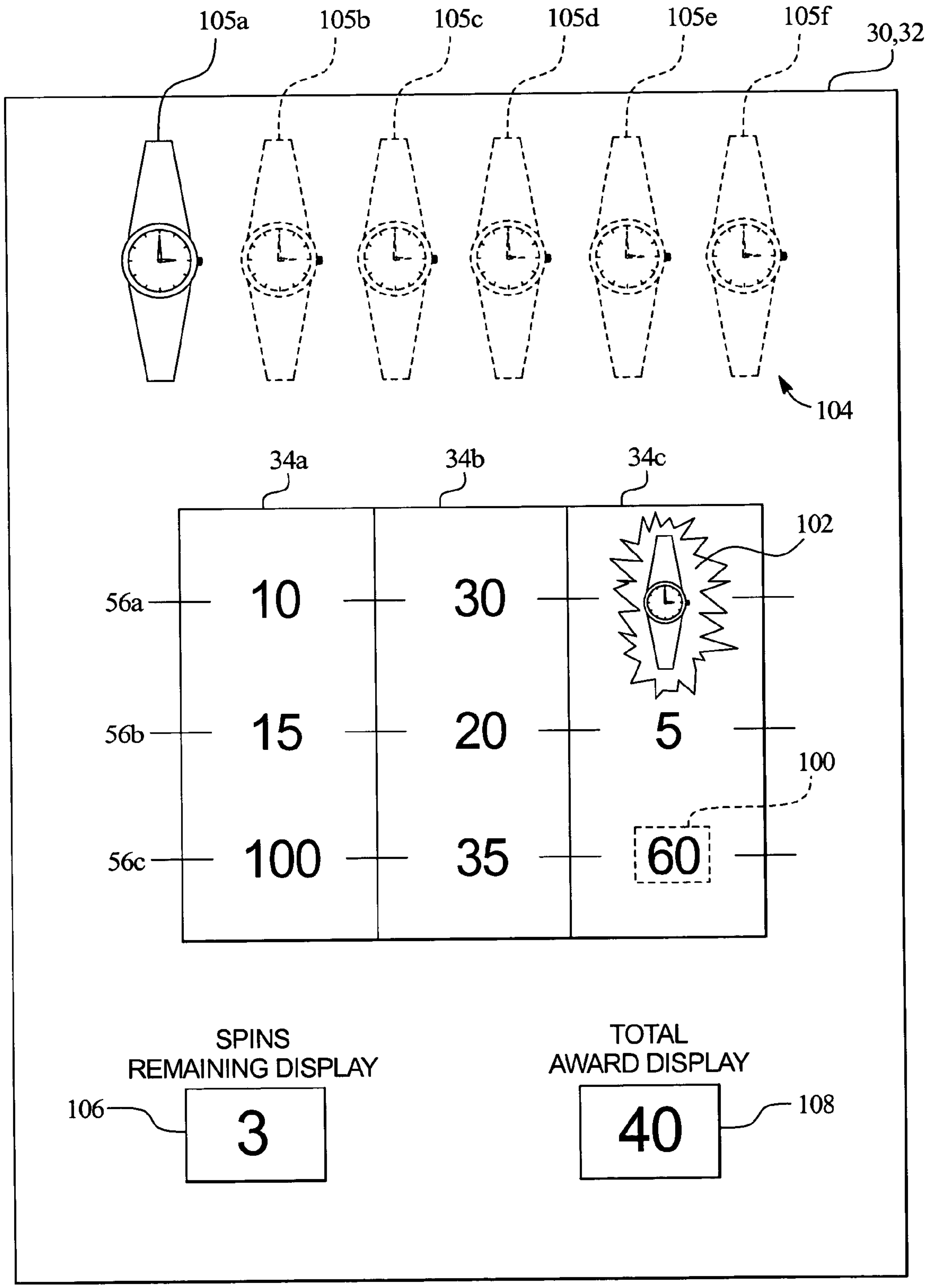

Referring to FIG. 4B, the gaming device or player activates or spins the reels 34 for the first time in the free spins game. In this example, the gaming device provides the player with the award associated with the symbols indicated on payline 56*b*. As stated above, the prize symbols 102 may be indicated on any of the paylines associated with the reels. In the first free spin, an award of forty is associated with the symbols indicated on payline 56*b*. An award of forty is determined by adding the values of fifteen, twenty and five associated with the symbols indicated on payline 56*b*. This award is added or transferred to the total award display as indicated by the total award display 108. Additionally, one prize symbol is indicated on the reels 34 in this free spin. Therefore, one of the prize symbol indicators 105*a* is illuminated or highlighted to represent the single indicated prize symbol in that free spin. The player now needs five more prize symbols to be indicated on the reels to obtain the physical prize in this free spins game as indicated by the prize symbol display 104. There are three free spins remaining as indicated by the spins remaining display 106.

Figure 4C:
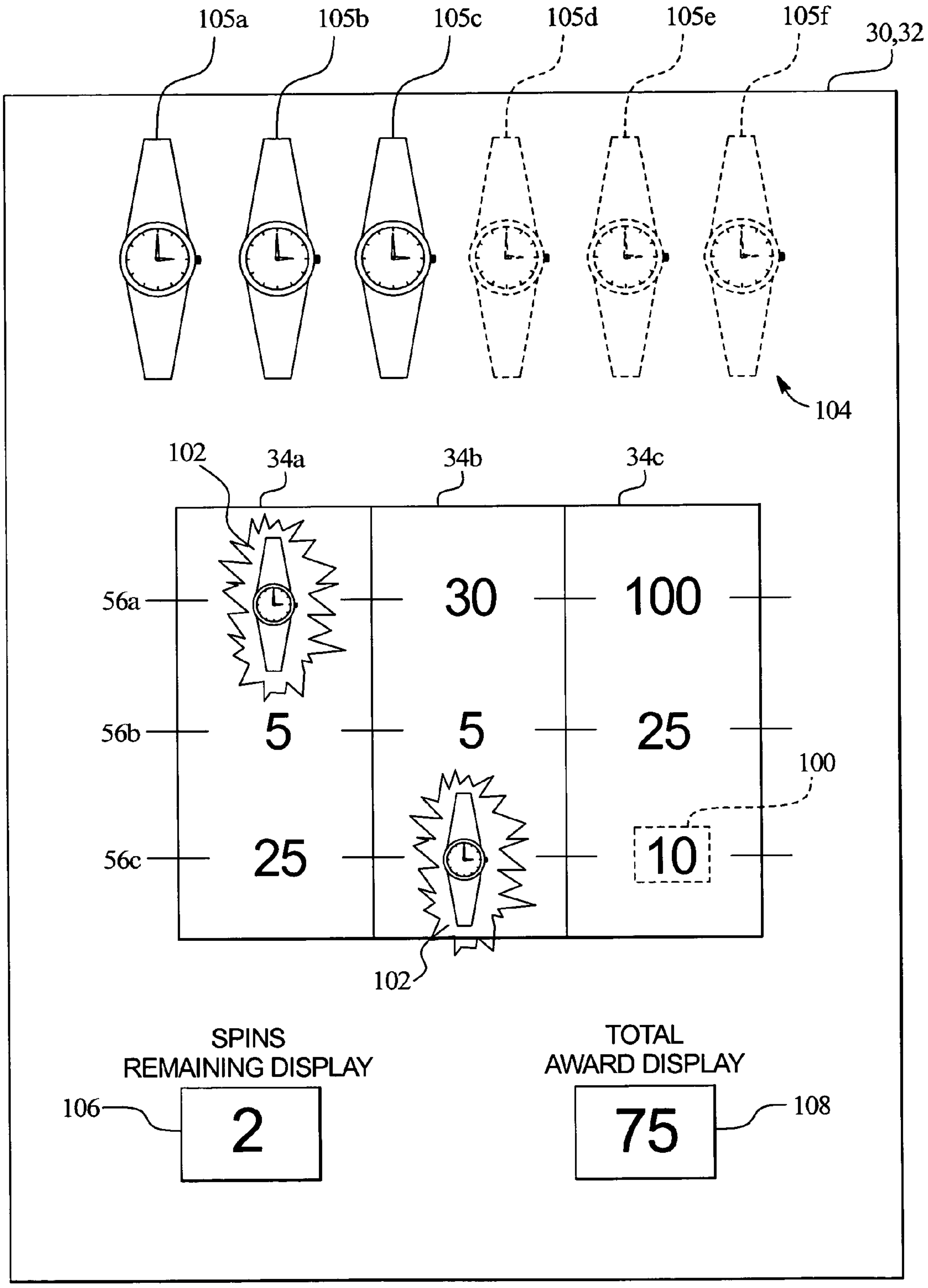

Referring to FIG. 4C, the gaming device or player activates or spins the reels for a second time in the free spins game. An award of thirty-five associated with the values of the symbols of five, five and twenty-five indicated on payline 56*b* is provided to the player. The award of thirty-five is added to the player's previous award of forty to give the player a total award of seventy-five as indicated by the total award display 108. In addition, two more prize symbols are indicated on the reels in this spin. Therefore, two of the prize symbol indicators 105*b* and 105*c* are illuminated or highlighted to represent the two prize symbols indicated on the reels 34 in this spin. The player now only has to accumulate three more prize symbols 102 in the game to obtain the physical prize. There are two free spins remaining in the free spins game as indicated by the spins remaining display 106.

Figure 4D:
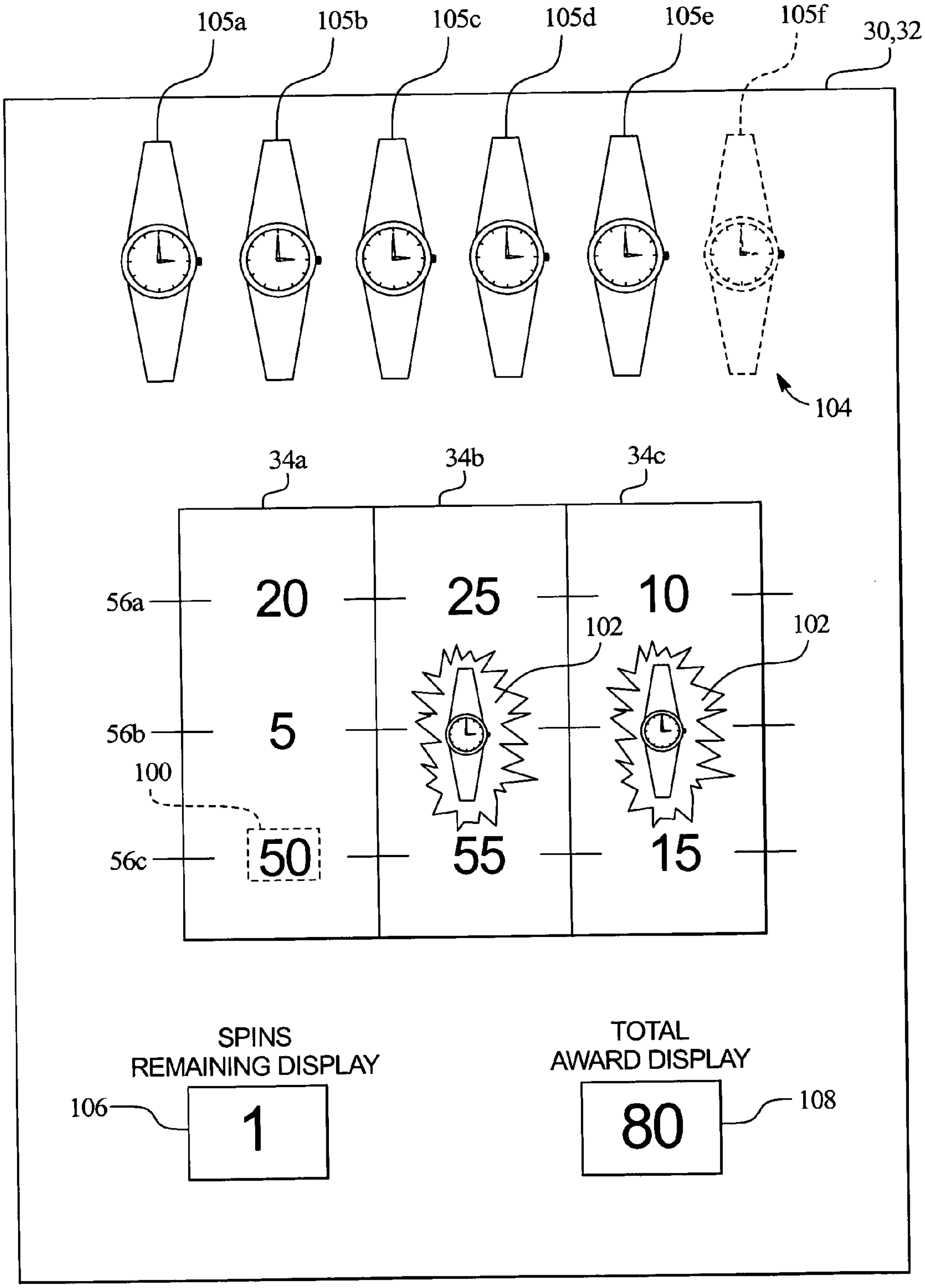

Referring to FIG. 4D, the gaming device or player activates or spins the reels 34 for a third time in the game. In this spin, an award of five associated with the symbol indicated on payline 56*b* is provided to the player and added to the player's total award of seventy-five. The player now has a total award of eighty as indicated by the total award display 108. Also, two more prize symbols are indicated on the reels in this spin. Thus, two of the prize symbol indicators 105*d* and 105*e* are highlighted or illuminated to represent the two prize symbols indicated on the reels. The player now only has to obtain one more prize symbol to obtain the physical prize associated with the prize symbols in the free spins game. There is only one spin remaining in the game as indicated by the spins remaining display 106.

Figure 4E:
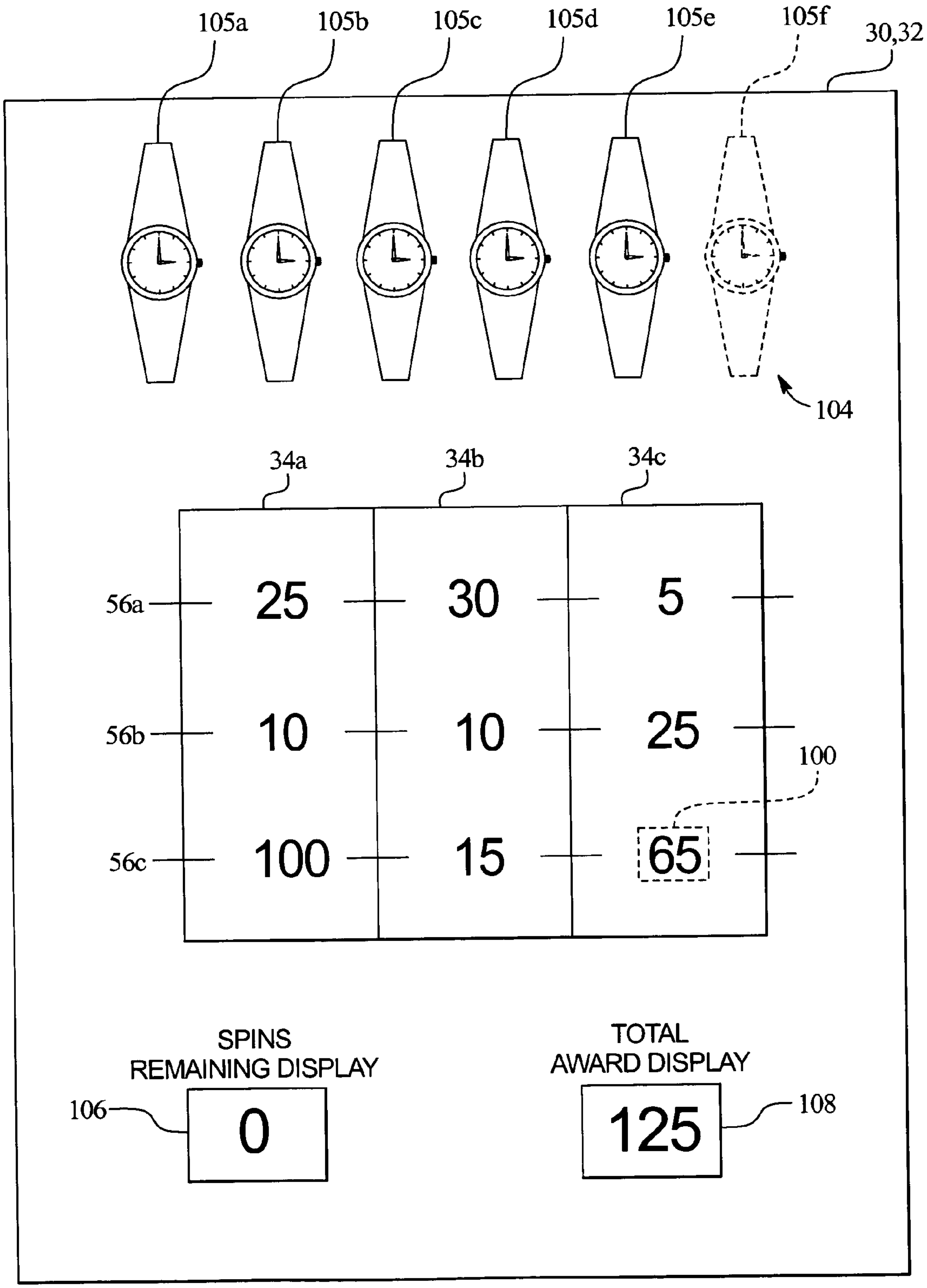

Referring to FIG. 4E, the gaming device or player spins the reels for the final time in the free spins game. The gaming device provides an award of forty-five to the player based on the symbols indicated on payline 56*b*. A prize symbol was not indicated on the reels in this spin in the game. Thus, the player did not obtain the final prize symbol needed to obtain the physical prize in the game. The award of forty-five is added to the player's previous total award of eighty to give the player a new total award of one hundred twenty-five as indicated by the total award display 108. The player does not have any free spins remaining in the free spins game as indicated by the spins remaining display 106 and therefore, the game ends. The player may return to the primary game or to another suitable game.

In one embodiment, the gaming device resets the prize symbol indicators 105 to zero prior to the next free spins game. The gaming device then designates a new number of prize symbols to be accumulated and also a new number of free spins or free activations of the reels for that free spins game.

In another embodiment, the designated number of prize symbols needed to be accumulated in a free spins game to obtain a physical prize in that game is greater than the number of prize symbols that can possibly be accumulated in the game. Therefore, at least one additional triggering event must occur in the free spins game to enable the player to accumulate the designated number of prize symbols in the game to obtain the physical prize. In one embodiment, the triggering event occurs when at least one re-trigger or re-activation symbol is indicated on the reels. In this embodiment, the gaming device provides at least one re-activation, re-spin or re-trigger of the reels such as a free spin of the reels for each re-activation symbol indicated on the reels.

In another embodiment, the gaming device re-activates, re-spins or re-triggers the reels when a combination of symbols including at least one re-activation symbol occurs on the reels. In further embodiment, the gaming device re-activates the reels for a designated number of spins when a re-activation symbol is indicated on the reels. The designated number of spins or activations may be randomly determined, predetermined or determined according to any suitable determination method. It should be appreciated that the re-activation symbol may be any suitable symbol, character or image. It should also be appreciated that the triggering event may be a symbol indicated on the reels, a combination of symbols indicated on the reels or any suitable triggering event desired by the game implementor.

Referring now to FIGS. 5A to 5D, an example of the above embodiment is illustrated where a player must obtain at least one re-activation, re-spin or re-trigger of the reels such as a free spin (i.e., a triggering event) to accumulate the necessary number of prize symbols to obtain a physical prize in the free spins game. In this example, the gaming device displays a plurality of reels including a plurality of symbols. The symbols include two prize symbols 102 and a re-activation symbol 110. The gaming device designates the number of prize symbols needed to obtain a physical prize in the game to be six as shown by the six symbol indicators 105*a* to 105*f* displayed on the display device. Also, the gaming device provides the player with two free spins or free activations of the reels at the start of the free spins game. Therefore, the number of prize symbols needed to be accumulated to obtain a physical prize exceeds the number prize symbols that can possibly be accumulated in the designated number of free spins or free activations in the free spins game. Thus, the player can only accumulate a maximum of four prize symbols in the free spins game because only two prize symbols can be indicated on the reels in each of the two free spins of the reels. As a result, the re-activation symbol must appear on the reels at least once to provide the player with an opportunity to accumulate the designated number of prize symbols to obtain the physical prize. In this example, the physical prize is a watch as represented by the prize symbol 102. Also, the gaming device provides at least one award associated with the symbols 100 indicated on payline 56*b*. The gaming device also accumulates the prize symbols 102 indicated on any of the paylines on the reels. The number of free spins provided to the player at the beginning of the free spins game is indicated by the spins remaining display 106 and the total award is indicated by the total award display 108.

Figure 5A:
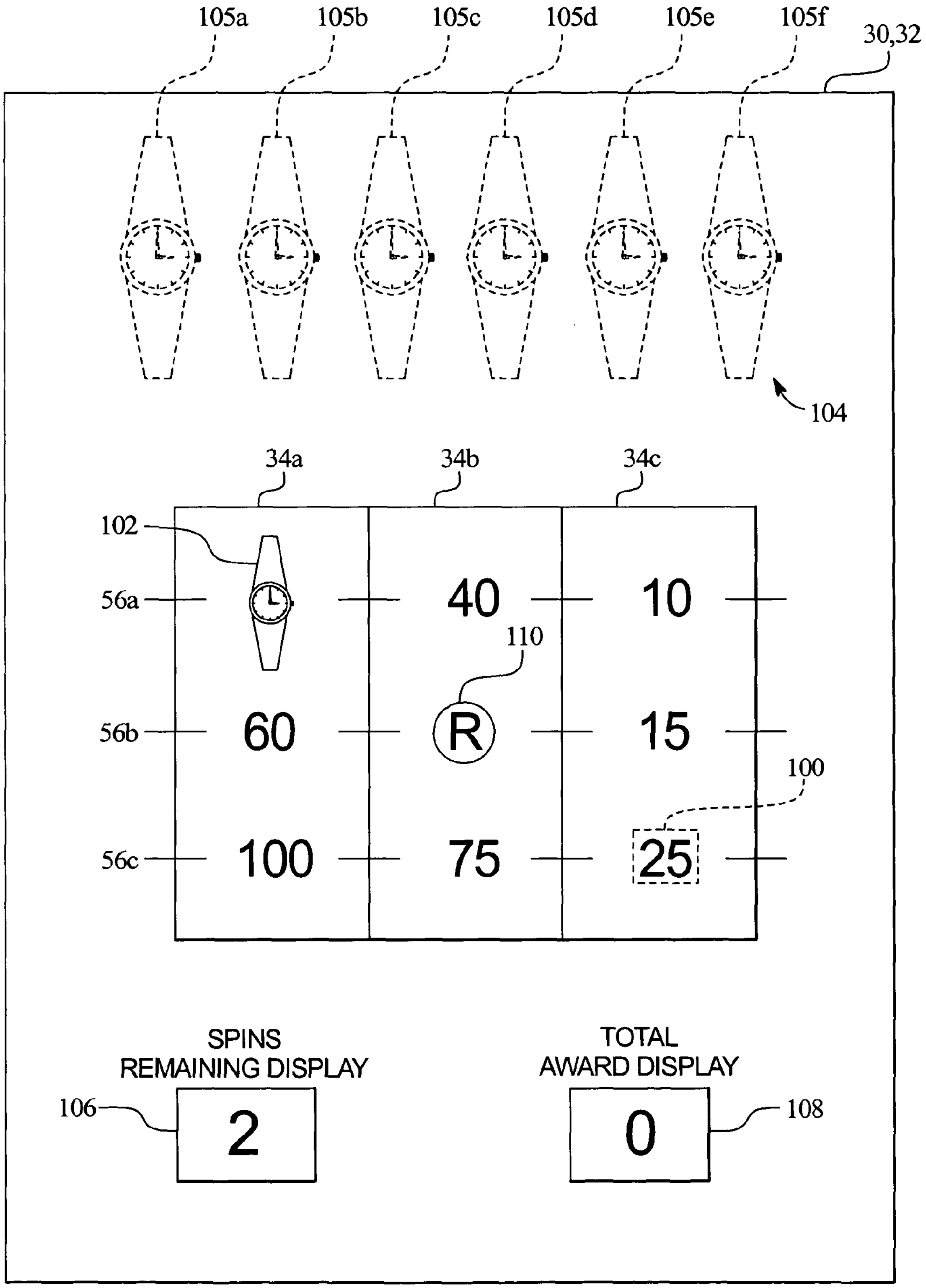
FIGS. 5A, 5B, 5C and 5D are enlarged elevation views of an example of another embodiment of the present invention.
Figure 5B:
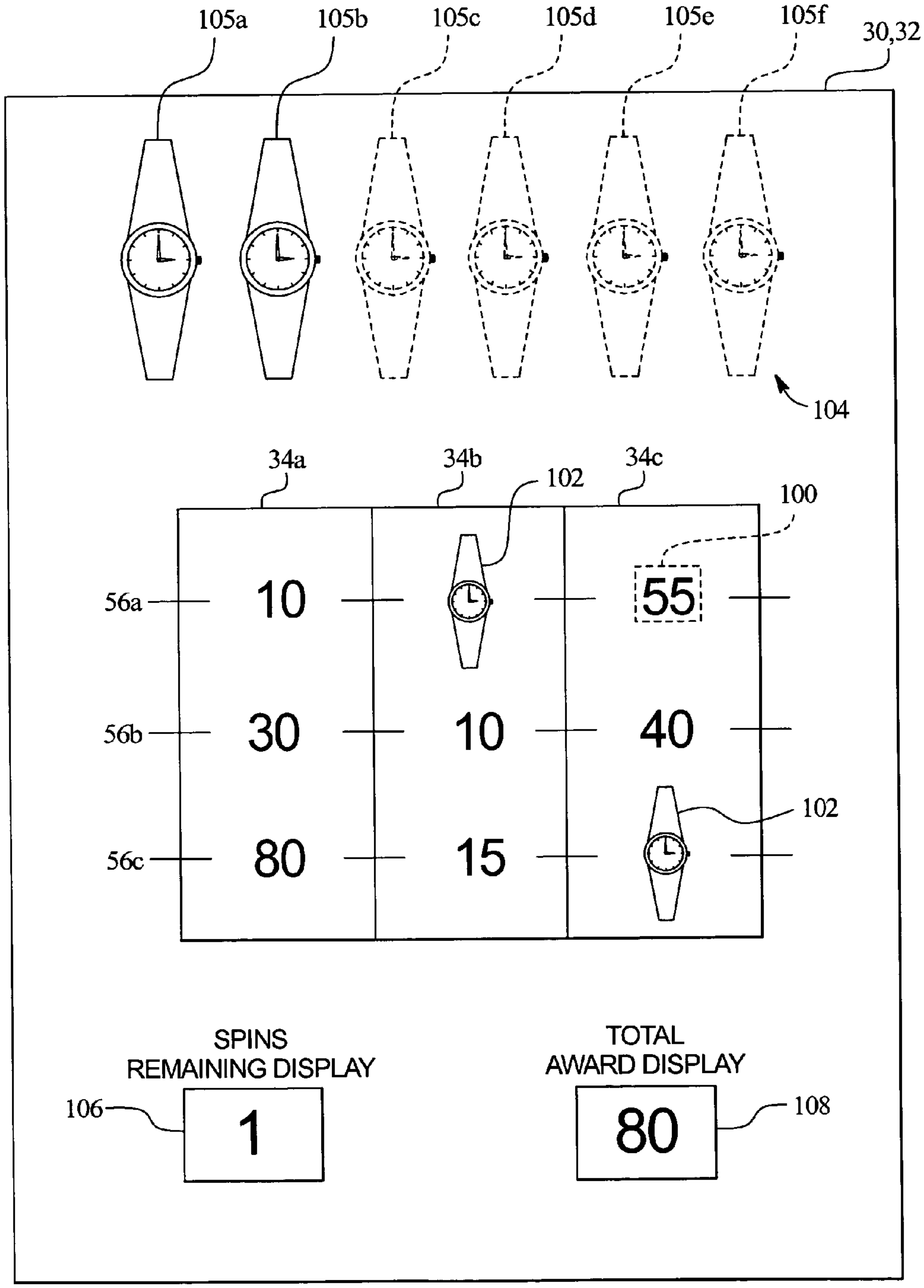

Referring to FIG. 5B, the gaming device activates or spins the reels for the first time in the game. Three symbols are indicated on payline 56*b* and two prize symbols are indicated on the reels. Thus, the gaming device provides an award of eighty, which is the sum of the awards of thirty, ten and forty associated with the symbols indicated on payline 56*b*, to the player as indicated by the total award display 108. Additionally, the two prize symbols 102 indicated on the reels are accumulated and indicated in the prize symbol display 104 by highlighting the prize symbol indicators 105*a* and 105*b*. The player has only one free spin or free activation remaining in the free spins game as indicated by the spins remaining display 106. Therefore, the player cannot accumulate the designated number of prize symbols needed to obtain the physical prize in the free spins game unless a re-activation symbol (i.e., triggering event) is indicated on the reels in the final free spin of the reels.

Figure 5C:
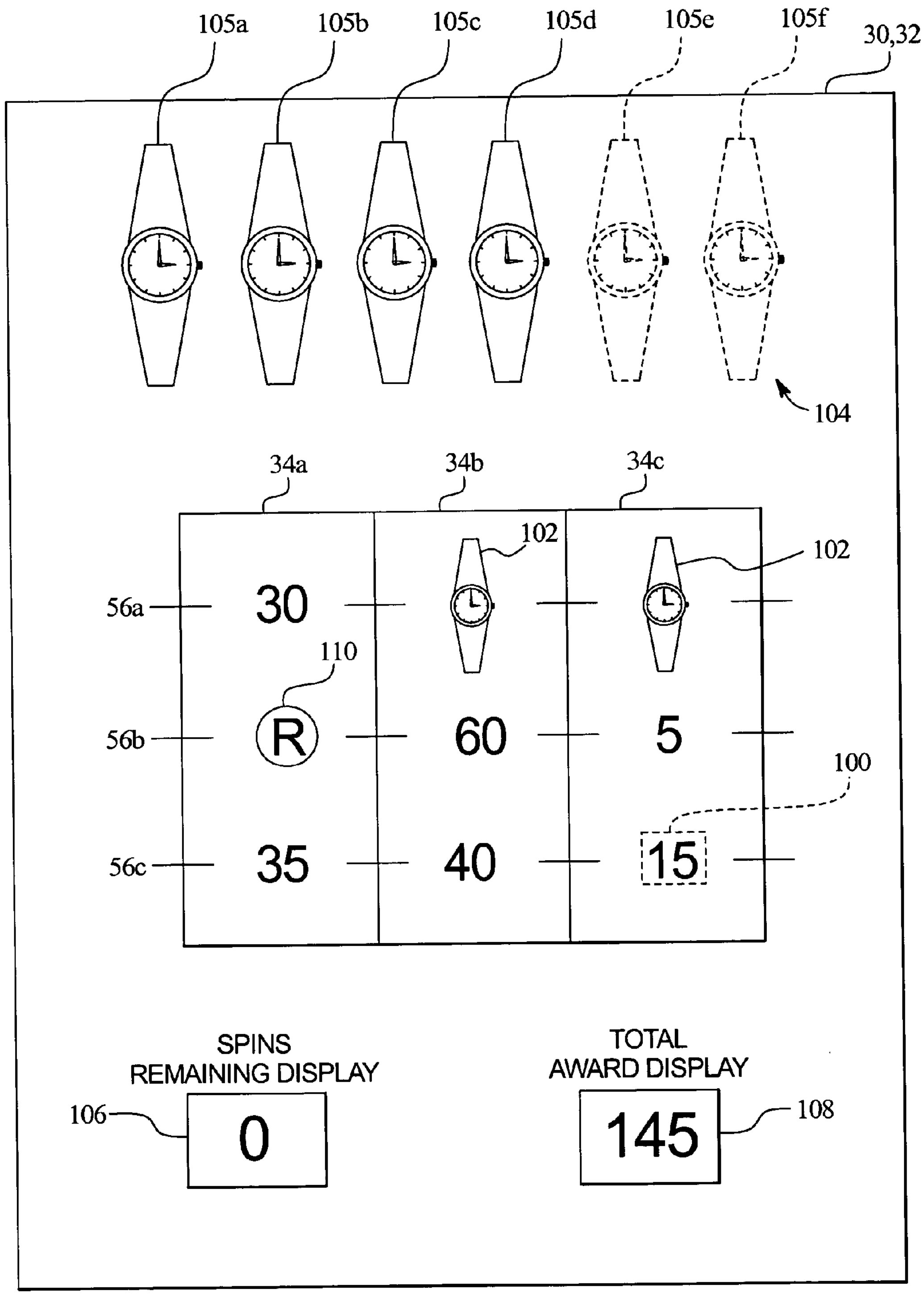

Referring to FIG. 5C, the gaming device activates or spins the reels for the second time in the free spins game. A re-trigger or re-activation symbol 110, two symbols 100 and two prize symbols are indicated on the reels. Awards of sixty and five, which are associated with the symbols indicated on payline 56*b*, are added to the player's total award of eighty to give the player a new total award of one hundred forty-five as indicated by the total award display 108. The prize symbols 102 are accumulated and indicated in the prize symbol display 104 by highlighting prize symbol indicators 105*c* and 105*d*. As shown by the prize symbol display 104, the player still needs to accumulate two more prize symbols to achieve the designated number of prize symbols and obtain the physical prize. Fortunately, the re-activation symbol 110 is indicated on the reels. Therefore in this example, the gaming device will re-activate or re-spin the reels one more time. The gaming device re-activates the reels automatically and therefore the number of free spins remaining in the game does not change as indicated by the spins remaining display 106. In another embodiment, the number of free activations or free spins associated with the re-activation symbol or symbols indicated on the reels is added to the number of activations or spins remaining and indicated by the spins remaining display.

Figure 5D:
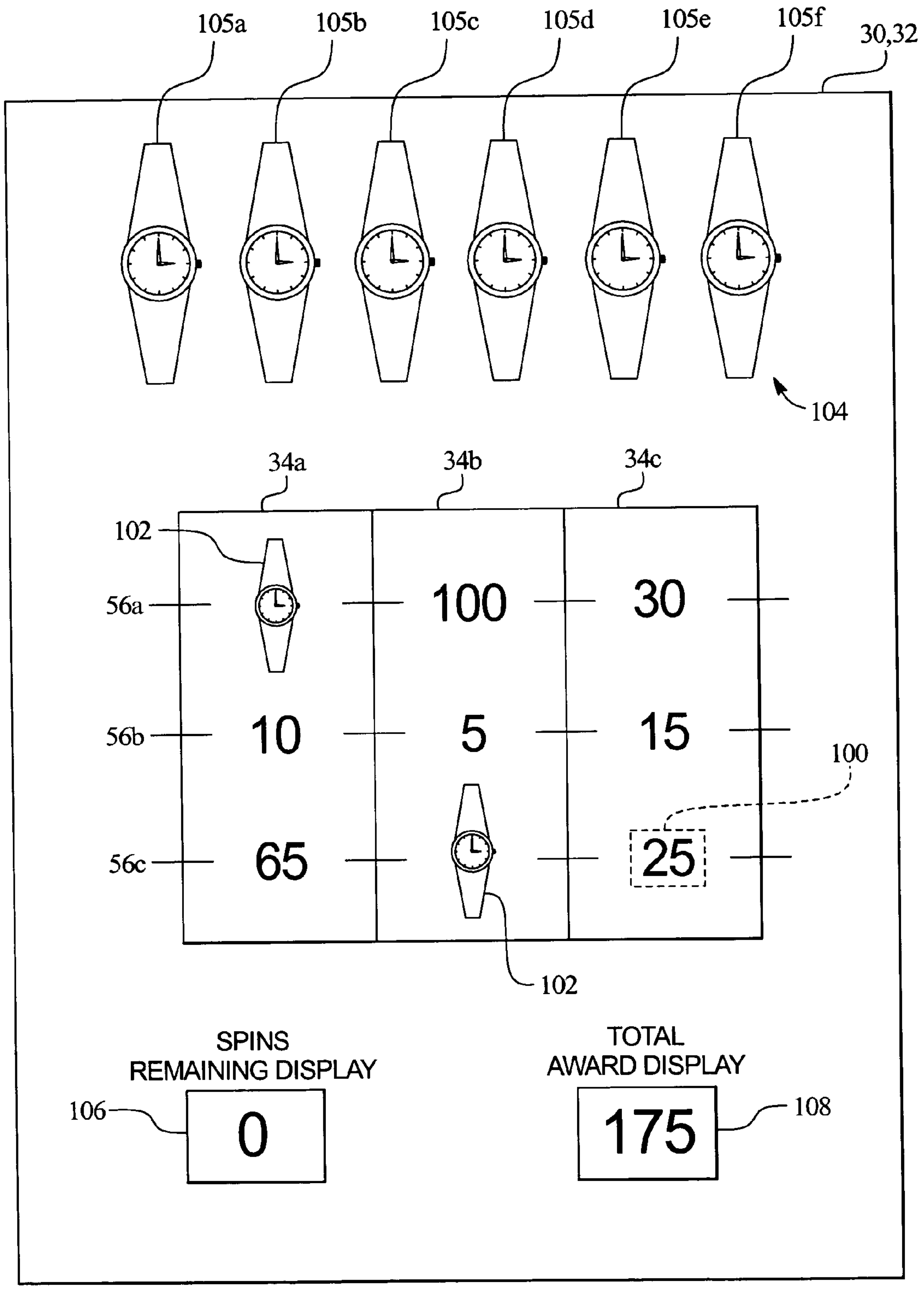

Referring to FIG. 5D, the gaming device utilizes the free spin obtained by the player and automatically re-activates the reels one time in the free spins game. Three symbols are indicated on payline 56*b*. Awards of ten, five and fifteen associated with those symbols are added to the player's total award of one hundred forty-five to provide a new total award in the game of one hundred seventy-five as indicated by the total award display 108. Additionally, two prize symbols 102 are indicated on the reels. The prize symbols are accumulated and indicated in the prize symbol display 104 by highlighting the prize symbol indicators 105*e* and 105*f*. The player has now accumulated six prize symbols in the game as indicated by the prize symbol display 104, which equals or achieves the designated number of prize symbols that must be accumulated to obtain the physical prize. Therefore, the gaming device awards the physical prize, a watch, to the player for accumulating the designated number of prize symbols in the free spins game. The gaming device also provides the total award of one hundred seventy-five as indicated in the total award display 108. Because no re-activation symbols are indicated on the reels and there are no free activations or free spins remaining in the free spins game, the game ends. The watch may be provided to the player according to any suitable redemption method as described above.

In another embodiment, the designated number of prize symbols necessary to be accumulated to win a physical prize are accumulated over a plurality of separately triggered games. In one such embodiment, the designated number of prize symbols are accumulated over a plurality of free spins games associated with a plurality of primary games. Initially, the gaming device designates a number of prize symbols to be accumulated to win a physical prize in the games. In each primary game, the gaming device provides a spin or spins of the reels based on a wager made by a player. Upon a triggering event in each primary game, the gaming device initiates a free spins mode or free spins game and provides a designated number of free spins to the player. The gaming device or player then spins or activates the reels for a designated number of free spins in each of the free spin games. As described above, any prize symbols 102 indicated on the reels 34 in the free spins game, are accumulated and indicated by the prize symbol indicators 105 in the prize symbol display 104 (the prize symbols are not accumulated in the primary game or games, and therefore, if the triggering event does not occur in the primary game, the player does not accumulate any prize symbols). If the accumulated number of prize symbols does not reach or equal the designated number of prize symbols in any one game, the accumulated number of prize symbols is maintained, held or saved for a designated number of subsequent free spins games, such as one or more free spins games triggered for instance in another primary game. If the accumulated number of prize symbols does not reach the designated number of prize symbols necessary to be accumulated to win the physical prize and the designated number of free spins games has been reached or played, the gaming device resets the accumulated number of prize symbols to zero. It should be appreciated that the accumulated number of prize symbols may be reset to any suitable number. In this embodiment, players have an opportunity to obtain a physical prize in any one of the games when the accumulated number of prize symbols reaches the designated number of prize symbols necessary to be accumulated in the games to win the physical prize.

In another embodiment, the gaming device designates a number of prize symbols necessary to be accumulated over a plurality of primary games. The gaming device or player spins the reels to accumulate any prize symbols indicated on the reels in each primary game. The accumulated prize symbols in each of the primary games are held or saved for a designated number of primary games. If the accumulated number of prize symbols does not reach or equal the designated number of prize symbols necessary to win the physical prize upon reaching the designated number of primary games, the gaming device resets the accumulated number of prize symbols to a suitable number such as zero. If the accumulated number of prize symbols reaches or equals the designated number of prize symbols necessary to be accumulated to win the physical prize in that number of plays of the primary game. It should be appreciated that the prize symbols may be accumulated in a primary game, a secondary game, a free spins game or any combination of games therein.

In one embodiment, when the accumulated number of prize symbols reaches the designated number of prize symbols which must be accumulated, the prize symbol display 104 resets the prize symbol indicators 105 to zero (i.e., removes the highlighting or illumination of the prize symbol indicators). In another embodiment, the processor designates a number of games and then resets the prize symbol indicators to zero after the designated number of games is achieved or reached.

Figure 6:
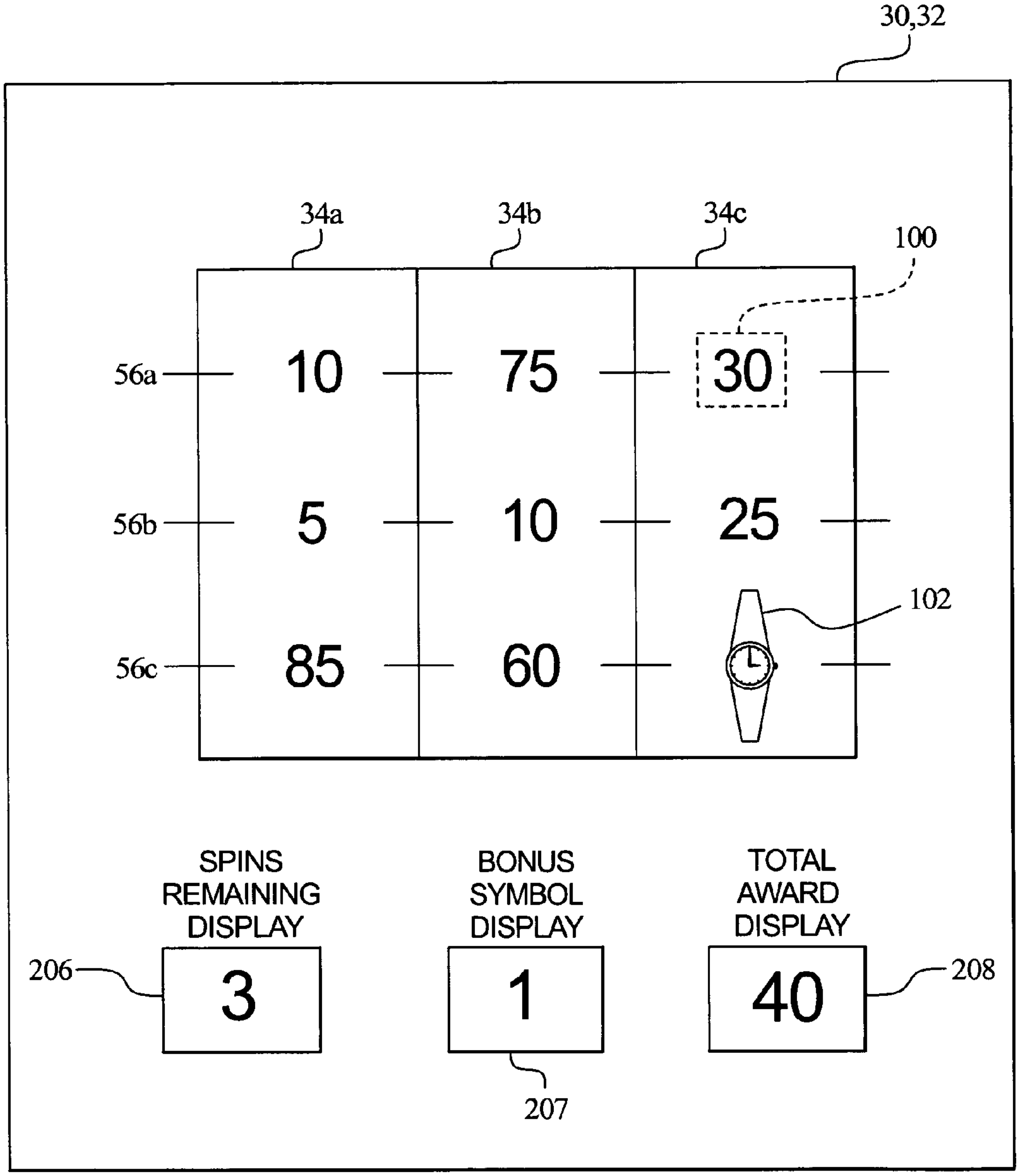
FIG. 6 is an enlarged elevation view of another embodiment of the present invention.

Referring to FIG. 6, another embodiment of the present invention is illustrated where the gaming device includes a prize symbol display 207 having a symbol indicator which is an integer or whole number. The symbol indicator (i.e., integer) indicates the number of prize symbols accumulated in a game. In this embodiment, the prize symbol display 207 increases by the number of prize symbols indicated on the reels in a free spin or free spins in a free spins game. For example, if four prize symbols are indicated on the reels in a free spin, the number of prize symbols indicated in the prize symbol display 207 increases by four. The game proceeds as described above and the player obtains a physical prize associated with the prize symbols when the designated number of prize symbols are accumulated on the reels in the designated number of free spins. If the player obtains the designated number of prize symbols in the free spins game, the gaming device awards the physical prize to the player.

In one embodiment described above, the prize symbol 102 is an image which represents the actual physical prize provided by the gaming device if the player accumulates the designated number of prize symbols needed to obtain the physical prize. In another embodiment, a randomly determine or predetermined symbol is displayed on the reels, where the symbol does not represent an image of the actual physical prize associated with the game.

In one embodiment, the gaming device provides one physical prize from a plurality of physical prizes to the player when the player accumulates the designated number of prize symbols needed to obtain the physical prize. In another embodiment, the gaming device enables the player to pick one of the plurality of physical prizes. The physical prizes may all be the same type of physical prize such as different styles of watches, which have different values, or the physical prizes may be different physical prizes such as watches, bicycles, televisions and cars with the same or different values. In one such embodiment, the processor may randomly determine the prize base on equal or weighted probabilities.

In a further embodiment, the reels in a game include a plurality of different prize symbols. In this embodiment, each of the different prize symbols is associated with a different physical prize. The processor designates a number of prize symbols that must be accumulated for each of the different prize symbols where the player must accumulate the designated number of prize symbols associated with a particular prize symbol to obtain the physical prize associated with that prize symbol. The gaming device or player then spins the reels and accumulates the different prize symbols. When the accumulated number of prize symbols achieves the designated number of prize symbols associated with a particular physical prize, the gaming device awards that physical prize to the player. In one aspect of this embodiment, the different physical prize symbols are images representing the actual physical prizes associated with the different prize symbols. In another such embodiment, the prize symbols are any suitable symbol, character or image desired by the game implementor. In this embodiment, the accumulation of prize symbols for both physical prizes can be displayed to the player.

In another embodiment, the present invention is employed in a card game. The card game includes a plurality of cards including symbols where at least one of the symbols includes a prize symbol. The gaming device designates a number of prize symbols to be accumulated in the game as described above, and deals card hands such as poker hands to the player. The player accumulates any prize symbols indicated on the player cards in the game. When the accumulated number of prize symbols on the cards reaches the designated number of prize symbols to be accumulated in the game, the gaming device provides the physical prize to the player.

In one alternative embodiment, the number of accumulated symbols necessary to obtain the physical prize is based at least in part on the relative amount of the wager by the player in the primary game. For instance, in one such embodiment, if the player makes a minimum wager, the number of accumulated prize symbols necessary to obtain the physical prize is a maximum number, and if the player makes the maximum wager, the number of accumulated prize symbols necessary to obtain the physical prize is a minimum number. Other variations can be employed in accordance with the present invention. In another such embodiment, the number of accumulated prize symbols necessary to obtain the physical prize remains the same; and for one, a plurality of or each prize symbol which occurs, the number of prize symbols which are accumulated are based on the player's wager. Thus, in one embodiment, the greater the wager, the greater the number of prize symbols which are accumulated when the prize symbol occurs on the reels or in the primary game. In one such embodiment, the number of prize symbols accumulated is based on or multiplied by a factor of the total player wager. In a further embodiment, the number of prize symbols needed to be accumulated to obtain the physical prize in a free spins game is reduced based on the player's wager. It should be appreciated that each of these methods can be employed alone or in combination with such other methods or other suitable methods for varying the probability of obtaining the physical prize based on the player's wager. This embodiment provides the player an advantage for making a larger wager. It should also be appreciated that these methods can be employed linearly or non-linearly in accordance with the present invention. It should thus be appreciated that these embodiments change the odds of winning the physical prize for the player.

In further embodiments, the odds of obtaining a designated number of spins or activations can be related or based at least in part on the player's wager. In further embodiments, the odds of obtaining a re-trigger or re-trigger symbol based at least in part on the player's wager. Thus in such embodiments, the odds of winning the physical prize change for the player based on the player's wager.

In further embodiments of the present invention, the gaming machine includes a plurality of different prize symbols and a plurality of different types or values of physical prizes. The player can obtain one or both of the different types of physical prizes or physical prizes of different values.

In one such embodiment, upon the trigger of a game such as a bonus game, the gaming device provides a plurality of free spins of a plurality of reels having a plurality of symbols on the reels. The symbols include at least one first prize symbol and at least one second prize symbol. The symbols also include at least one re-trigger symbol. A designated number of first prize symbols are necessary to be accumulated to win a first physical prize. A designated number of second prize symbols are necessary to be accumulated to win a second physical prize. In one such embodiment, the designated number of first prize symbols is greater than the number of first prize symbols which can possibly be accumulated in the initial designated number of free spins of the reels. Likewise, in one embodiment, the designated number of second prize symbols is greater than the number of second prize symbols which can possibly be accumulated in the initial designated number of free spins of the reels. In this embodiment, the player must obtain a re-trigger to obtain the first physical prize and/or the second physical prize. In one such embodiment, the player can win either the first physical prize, the second physical prize or both the first physical prize and the second physical prize. In a further embodiment, after one accumulation is completed for one or both of the first or second physical prizes, the accumulation counter for that or those physical prizes is reset and can be subsequently completed during the remaining free spins. It should also be appreciated that in an alternative embodiment, the player can accumulate the necessary number of first prize symbols to obtain the first physical prize without a re-trigger and can accumulate the necessary number of second prize symbols to obtain the second physical prize without a re-trigger.

It should be appreciated that in such embodiments, the gaming device can include a suitable display or meter which indicates to the player the number of accumulated first prize symbols, accumulated second prize symbols, the necessary number of first prize symbols to obtain the first physical prize and the necessary number of second prize symbols to obtain the second physical prize. It should further be appreciated that in such embodiments, the gaming device can include a suitable display or meter which indicates to the player the number of each type of physical prize won by the player, especially in the embodiment where the accumulation is reset and further spins are remaining.

It should also be appreciated that the gaming machine can allow the player to select or collect the physical prizes after the necessary number of symbols are accumulated or after the free spins are completed.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, after a wager by a player, and for a single play of a game, to:

(i) display a plurality of reels, the plurality of reels including a plurality of symbols, said symbols including at least one prize symbol associated with a physical prize and at least one re-trigger symbol, (ii) determine a quantity of initial spins of the reels which will subsequently be displayed, the determined quantity of initial spins being greater than one, (iii) display a first designated number, said first designated number initially being equal to the determined quantity of initial spins of the reels, (iv) for one of the initial spins of the reels, display said reels spinning and stopping, (v) reduce the displayed first designated number to indicate how many of the determined quantity of initial spins remain to be subsequently displayed, (vi) repeat (iv) and (v) until the displayed first designated number reaches zero, (vii) display at least one additional spin of the reels if a predetermined symbol combination including the re-trigger symbol occurs on the reels during the displayed initial spins of the reels, (viii) accumulate any prize symbols which occur on the reels in each of said displayed initial spins and said at least one additional spin of the reels, (ix) cause the physical prize to be awarded to the player if the accumulated number of prize symbols reaches a second designated number of prize symbols necessary to be accumulated to win the associated physical prize, wherein the second designated number of prize symbols is greater than the number of prize symbols which can possibly be accumulated in the displayed initial spins of the reels, and (x) cause the single play of the game to end and reset the accumulated number of prize symbols to zero.

2. The gaming device of claim 1, which includes at least one payline associated with the reels.

3. The gaming device of claim 2, wherein when executed by the at least one processor, the plurality of instructions cause the at least one processor to accumulate any prize symbols which occur on any of the paylines in each of the displayed initial spins and the at least one additional spin of the reels.

4. The gaming device of claim 1, wherein the game includes a primary game operable upon the wager, and wherein when executed by the at least one processor, the plurality of instructions cause the at least one processor to operate with the at least one display device to display the initial spins of the reels in the single play of the primary game.

5. The gaming device of claim 1, wherein the prize symbol includes an image which represents the physical prize.

6. The gaming device of claim 1, wherein the quantity of initial spins of the reels is randomly determined.

7. The gaming device of claim 1, wherein the first quantity of initial spins of the reels is predetermined.

8. The gaming device of claim 1, wherein the second designated number of prize symbols is randomly determined.

9. The gaming device of claim 1, wherein the second designated number of prize symbols is predetermined.

10. The gaming device of claim 1, which includes a plurality of different physical prizes, wherein when executed by the at least one processor, the plurality of instructions cause the at least one processor to cause one of said physical prizes to be provided to the player when the accumulated number of prize symbols reaches the second designated number of prize symbols necessary to win said physical prize to be provided.

11. The gaming device of claim 10, wherein at least two of the physical prizes have different values.

12. The gaming device of claim 10, which includes a probability of being selected by the at least one processor associated with each of the physical prizes, wherein when executed by the at least one processor, the plurality of instructions cause the at least one processor, based on said probabilities, to: (i) select one of the physical prizes, and (ii) cause the selected physical prize to be provided to the player.

13. The gaming device of claim 1, which includes a plurality of different physical prizes, wherein when executed by the at least one processor, the plurality of instructions cause the at least one processor to enable the player to pick one of said physical prizes if the accumulated number of prize symbols reaches the second designated number of prize symbols.

14. The gaming device of claim 1, which includes a prize symbol display operable to indicate the number of accumulated prize symbols.

15. The gaming device of claim 14, wherein the prize symbol display includes a plurality of prize symbol indicators.

16. The gaming device of claim 15, which includes at least one illumination device associated with the prize symbol indicators.

17. The gaming device of claim 14, wherein the prize symbol display includes an integer which represents the accumulated number of prize symbols.

18. The gaming device of claim 17, wherein the integer increments by at least one for each prize symbol which occurs on the reels.

19. The gaming device of claim 1, wherein the at least one additional spin includes at least one free spin.

20. The gaming device of claim 1, wherein the quantity of initial spins is determined at least in part based on the wager.

21. The gaming device of claim 1, wherein the second designated number of the prize symbols necessary to be accumulated to win the physical prize is at least in part based on the wager such that: (i) for a first wager, a first quantity of the prize symbols is necessary to be accumulated to win the physical prize, and (ii) for a second, different wager, a second, different quantity of the prize symbols is necessary to be accumulated to win the physical prize.

22. The gaming device of claim 1, wherein the number of prize symbols which are accumulated based on each prize symbol which occurs on the reels is at least in part based on the wager.

23. The gaming device of claim 1, wherein the predetermined symbol combination is associated with a probability of occurring on the reels, and the probability is at least in part based on the wager.

24. The gaming device of claim 1, wherein when executed by the at least one processor, the plurality of instructions cause the at least one processor to enable the player to select the physical prize.

25. A gaming device comprising:

at least one display device;

at least one input device;

at least one processor; and at least one memory device which stores a plurality of instructions, which when executed by the at least one processor, cause the at least one processor to operate with the at least one display device and the at least one input device, after a wager by a player, and for a single play of a game, to:

(i) display a plurality of reels including a plurality of symbols on the reels, said symbols including at least one first prize symbol associated with a first physical prize, at least one second prize symbol associated with a second different physical prize, and at least one re-trigger symbol;

(ii) determine a quantity of initial spins of the reels which will subsequently be displayed, the determined quantity of initial spins being greater than one, (iii) display a first designated number, said first designated number initially being equal to the determined quantity of initial spins of the reels, (iv) for one of the initial spins of the reels, display said reels, spinning and stopping, (v) reduce the displayed first designated number to indicate how many of the determined quantity of initial spins remain to be subsequently displayed, (vi) repeat (iv) and (v) until the displayed first designated number reaches zero, (vii) display at least one additional spin of the reels when a predetermined symbol combination including the re-trigger symbol occurs on the reels during the displayed initial spins of the reels, (viii) accumulate any first prize symbols which occur on the reels in each of said displayed initial spins and said at least one additional spin of the reels, (ix) accumulate any second prize symbols which occur on the reels in each of said displayed initial spins and said at least one additional spin of the reels, (x) cause the first physical prize to be awarded to the player if the accumulated number of first prize symbols reaches a second designated number of first prize symbols necessary to be accumulated to win the associated first physical prize, wherein the second designated number of first prize symbols is greater than the number of first prize symbols which can possibly be accumulated in the displayed initial spins of the reels, (xi) cause the second physical prize to be awarded to the player if the accumulated number of second prize symbols reaches a third designated number of second prize symbols necessary to be accumulated to win the associated second physical prize, wherein the third designated number of second prize symbols is greater than the number of second prize symbols which can possibly be accumulated in the displayed initial spins of the reels, and (xii) cause the single play of the game to end, reset the accumulated number of first prize symbols to zero, and reset the accumulated number of second prize symbols to zero.

26. The gaming device of claim 25, wherein the game includes a primary game operable upon the wager, and wherein when executed by the at least one processor, the plurality of instructions cause the at least one processor to operate with the at least one display device to display the initial spins of the reels in the single play of the primary game.

27. The gaming device of claim 25, wherein the first physical prize is of a higher value than the second physical prize.

28. The gaming device of claim 27, which includes a higher probability of obtaining the second physical prize than the first physical prize.

29. The gaming device of claim 25, wherein the at least one additional spin includes at least one free spin.

30. The gaming device of claim 25, wherein the quantity of initial spins is determined at least in part based on the wager.

31. The gaming device of claim 25, wherein the second designated number of the first prize symbols necessary to be accumulated to win the first physical prize is at least in part based on the wager such that: (i) for a first wager, a first quantity of the first prize symbols is necessary to be accumulated to win the first physical prize, and (ii) for a second, different wager, a second, different quantity of the first prize symbols is necessary to be accumulated to win the first physical prize.

32. The gaming device of claim 25, wherein the third designated number of the second prize symbols necessary to be accumulated to win the second physical prize is at least in part based on the wager such that: (i) for a first wager, a first quantity of the second prize symbols is necessary to be accumulated to win the second physical prize, and (ii) for a second, different wager, a second, different quantity of the second prize symbols is necessary to be accumulated to win the second physical prize.

33. The gaming device of claim 25, wherein the number of prize symbols accumulated for each prize symbol which occurs on the reels is at least in part based on the wager.

34. The gaming device of claim 25, wherein the predetermined symbol combination is associated with a probability of occurring on the reels, and the probability is at least in part based on the wager.

35. A gaming device comprising:

at least one display device;

at least one input device;

at least one processor; and at least one memory device which stores a plurality of instructions, which when executed by the at least one processor, cause the at least one processor to operate with the at least one display device and the at least one input device, after a wager by a player for a play of a primary game and after an occurrence of a triggering event in association with the play of the primary game, to:

(i) initiate a single play of a secondary game associated with a physical prize, the second game associated with a set of reels having a plurality of symbols, the symbols including at least one prize symbol associated with the physical prize and at least one re-trigger symbol, (ii) determine a quantity of initial spins of the reels which will subsequently be displayed for the single play of the secondary game, the determined quantity of initial spins being greater than one, (iii) display a first designated number, said first designated number initially being equal to the determined quantity of initial spins of the reels, (iv) for each one of the determined quantity of initial spins of the reels in the single play of the secondary game:

(a) display said reels spinning and stopping, and (b) reduce the displayed first designated number to indicate how many of the determined quantity of initial spins remain to be subsequently displayed, (v) display at least one additional spin of the reels if a predetermined symbol combination including the re-trigger symbol occurs on the reels during the displayed initial spins of the reels in the secondary game, (vi) accumulate any prize symbols which occur on the reels in the displayed initial spins and the at least one additional spin of the reels in the secondary game, (vii) cause the physical prize to be awarded to the player if the accumulated number of prize symbols reaches a second designated number of prize symbols necessary to be accumulated in the secondary game to win the physical prize, wherein the second designated number of prize symbols is greater than the number of prize symbols that can possibly be accumulated in the displayed initial spins of the reels in the secondary game, and (viii) cause the single play of the secondary game to end and reset the accumulated number of prize symbols to zero.

36. The gaming device of claim 35, wherein the triggering event includes a combination of symbols occurring on a set of the reels in association with the primary game.

37. The gaming device of claim 35, wherein the quantity of initial spins includes free spins.

38. The gaming device of claim 35, wherein the quantity of initial spins is determined at least in part based on a the wager made by the player.

39. The gaming device of claim 35, wherein the second designated number of the prize symbols necessary to be accumulated to win the physical prize is at least in part based on the wager made by the player such that: (i) for a first wager made by the player, a first quantity of the prize symbols is necessary to be accumulated to win the physical prize, and (ii) for a second, different wager made by the player, a second, different quantity of the prize symbols is necessary to be accumulated to win the physical prize.

40. The gaming device of claim 35, wherein the number of prize symbols accumulated for each prize symbol which occurs on the reels is at least in part based on the wager made by the player.

41. The gaming device of claim 35, wherein the predetermined symbol combination is associated with a probability of occurring on the reels, and the probability is at least in part based on the wager made by the player.

42. A gaming device comprising:

at least one display device;

at least one input device;

at least one processor; and at least one memory device which stores a plurality of instructions, which when executed by the at least one processor, cause the at least one processor to operate with the at least one display device and the at least one input device, after a wager by a player, and for a single play of a game, to:

(i) display a plurality of reels including a plurality of symbols on the reels, said symbols including at least one first prize symbol associated with a first physical prize, at least one second prize symbol associated with a second different physical prize, and at least one re-trigger symbol, wherein the first physical prize is of a higher value than the second physical prize;

(ii) determine a quantity of initial spins of the reels which will subsequently be displayed, the determined quantity of initial spins being greater than one;

(iii) display a first designated number, said first designated number initially being equal to the determined quantity of initial spins of the reels;

(iv) for one of the initial spins of the reels, display said reels spinning and stopping, (v) reduce the displayed first designated number to indicate how many of the determined quantity of initial spins remain to be subsequently displayed, (vi) repeat (iv) and (v) until the displayed first designated number reaches zero, (vii) display at least one free spin of the reels if a predetermined symbol combination including the re-trigger symbol occurs on the reels during the displayed initial spins of the reels, (viii) accumulate any first prize symbols which occur on the reels in each of said displayed initial spins and said at least one free spin of the reels, (ix) accumulate any second prize symbols which occur on the reels in each of said displayed initial spins and said at least one free spin of the reels, (x) cause the first physical prize to be awarded to the player if the accumulated number of first prize symbols reaches a second designated number of the first prize symbols necessary to be accumulated to win the associated first physical prize, wherein the predetermined symbol combination including the re-trigger symbol must occur on the reels at least once to accumulate the second designated number of the first prize symbols, (xi) cause the second physical prize to be awarded to the player if the accumulated number of second prize symbols reaches a third designated number of the second prize symbols necessary to be accumulated to win the associated second different physical prize, wherein the predetermined symbol combination including the re-trigger symbol must occur on the reels at least once to accumulate the third designated number of the second prize symbols, and (xii) cause the single play of the game to end, reset the accumulated number of first prize symbols to zero, and reset the accumulated number of second prize symbols to zero.

43. The gaming device of claim 42, wherein when executed by the at least one processor, the plurality of instructions cause the at least one processor to operate with the at least one display device to display a primary game operable upon the wager, and display the initial spins of the reels in the primary game.

44. The gaming device of claim 42, which includes a higher probability of obtaining the second physical prize than obtaining the first physical prize.

45. The gaming device of claim 42, wherein the quantity of initial spins of the reels is determined at least in part based on the wager.

46. The gaming device of claim 42, wherein the second designated number of the first prize symbols necessary to be accumulated to win the first physical prize is at least in part based on the wager such that: (i) for a first wager made by the player, a first quantity of the first prize symbols is necessary to be accumulated to win the first physical prize, and (ii) for a second, different wager made by the player, a second, different quantity of the first prize symbols is necessary to be accumulated to win the first physical prize.

47. The gaming device of claim 42, wherein the third designated number of the second prize symbols necessary to be accumulated to win the second physical prize is at least in part based on the wager made by the player such that: (i) for a first wager, a first quantity of the second prize symbols is necessary to be accumulated to win the second physical prize, and (ii) for a second, different wager, a second, different quantity of the second prize symbols is necessary to be accumulated to win the second physical prize.

48. The gaming device of claim 42, wherein the number of prize symbols which are accumulated for each prize symbol which occurs on the reels is at least in part based on the wager.

49. The gaming device of claim 42, wherein the predetermined symbol combination is associated with a probability of occurring on the reels, and the probability is at least in part based on the wager.

50. A method for operating a gaming device; said method comprising:

(a) causing at least one display device to display a play of a primary game operable upon a wager made by a player;

(b) initiating a single play of a secondary game upon an occurrence of a triggering event in association with the play of the primary game; and (c) for the single play of the secondary game:

(i) determining a quantity of initial spins of a plurality of reels which will subsequently be displayed in the single play of the secondary game, the determined quantity of initial spins being greater than one;

(ii) designating a first number, said first designated number initially being equal to the determined quantity of initial spins of the reels;

(iii) designating a second number of prize symbols necessary to be accumulated to win a physical prize in the secondary game, wherein the designated second number of prize symbols is greater than a number of prize symbols which can possibly be accumulated in the quantity of initial spins of the reels in the single play of the secondary game;

(iv) causing the at least one display device to display the designated first number;

(v) for each one of the initial spins of the reels in the secondary game:

(A) causing the at least one display device to display said reels spinning and stopping, and (B) reducing the displayed designated first number to indicate how many of the determined quantity of initial spins remain to be subsequently displayed;

(vi) accumulating any prize symbols which occur on the reels during the displayed initial spins of the reels;

(vii) causing the at least one display device to display at least one additional spin of the reels if a secondary triggering event occurs in association with the single play of the secondary game;

(viii) awarding the physical prize to the player if the accumulated number of prize symbols reaches the designated second number of prize symbols necessary to win the physical prize in the single play of the secondary game; and (ix) causing the single play of the secondary game to end and resetting the accumulated number of prize symbols to zero.

51. The method of claim 50, wherein accumulating any prize symbols which occur on the reels includes accumulating any prize symbols indicated on at least one payline associated with the reels.

52. The method of claim 50, which includes randomly determining the quantity of initial spins of the reels.

53. The method of claim 50, which includes pre-determining the quantity of initial spins of the reels.

54. The method of claim 50, which includes randomly determining the designated second number of prize symbols necessary to be accumulated to win the physical prize in the secondary game.

55. The method of claim 50, which includes pre-determining the designated second number of prize symbols necessary to be accumulated to win the physical prize in the secondary game.

56. The method of claim 50, which includes causing a prize symbol display to display the accumulated number of prize symbols.

57. The method of claim 50, which includes providing the physical prize from a plurality of different physical prizes.

58. The method of claim 50, which includes enabling the player to pick the physical prize from a plurality of different physical prizes.

59. The method of claim 50, wherein awarding the physical prize to the player includes generating a prize code.

60. The method of claim 59, which includes placing the prize code on at least one of: a receipt, a ticket, a printing medium and a recording medium.

61. The method of claim 50, wherein the quantity of initial spins includes free spins.

62. The method of claim 50, wherein the quantity of initial spins is determined at least in part based on the wager.

63. The method of claim 50, wherein the second designated number of the prize symbols necessary to be accumulated to win the physical prize is at least in part based on the wager such that: (i) for a first wager made by the player, a first quantity of the prize symbols is necessary to be accumulated to win the physical prize, and (ii) for a second, different wager made by the player, a second, different quantity of the prize symbols is necessary to be accumulated to win the physical prize.

64. The method of claim 50, wherein the number of prize symbols accumulated for each prize symbol which occurs on the reels is at least in part based on the wager.

65. The method of claim 50, wherein odds of the secondary triggering event occurring is at least in part based on the wager.

66. The method of claim 50, wherein the steps (a) to (c) are controlled through a data network.

67. The method of claim 66, wherein the data network is an internet.

68. A method of operating a gaming device after a wager by a player, and for a single play of a game, said method comprising:

(a) after the wager by the player, start the single play of the game;

(b) causing at least one display device to display a plurality of reels and a plurality of symbols on the reels, said symbols including at least one first prize symbol, at least one second prize symbol and at least one re-trigger symbol;

(c) determining a quantity of initial spins of the reels which will subsequently be displayed, the determined quantity of initial spins being greater than one;

(d) designating a first number, said designated first number initially being equal to the determined quantity of initial spins of the reels which will subsequently be displayed;

(e) designating a second number of the first prize symbols necessary to be accumulated to win a first physical prize, wherein the designated second number of first prize symbols is greater than a number of first prize symbols which can possibly be accumulated in the determined quantity of initial spins of the reels;

(f) designating a third number of the second prize symbols necessary to be accumulated to win a second different physical prize, wherein the designated third number of second prize symbols is greater than the number of second prize symbols which can possibly be accumulated in the determined quantity of initial spins of the reels;

(g) causing the at least one display device to display the first designated number;

(h) for one of the initial spins of the reels, causing the at least one display device to display the reels spinning and stopping;

(i) reducing the displayed designated first number to indicate how many of the determined quantity of initial spins remain to be subsequently displayed;

(i) repeating (h) and (i) until the displayed designated first number reaches zero;

(k) causing the at least one display device to display at least one additional spin of the reels if a predetermined symbol combination including the re-trigger symbol occurs on the reels during the displayed initial spins of the reels;

(l) accumulating any first prize symbols which occurs on the reels in each of said displayed initial spins and said at least one additional spin of the reels;

(m) accumulating any second prize symbols which occurs on the reels in each of said displayed initial spins and said at least one additional spin of the reels;

(n) awarding the first physical prize to the player if the accumulated number of first prize symbols reaches the designated second number of first prize symbols;

(o) awarding the second physical prize to the player if the accumulated number of second prize symbols reaches the designated third number of second prize symbols; and (p) causing the single play of the game to end, resetting the accumulated number of first prize symbols to zero, and resetting the accumulated number of second prize symbols to zero.

69. The method of claim 68, wherein the first physical prize is of a higher value than the second physical prize.

70. The method claim 69, which includes a higher probability of obtaining the second physical prize than the first physical prize.

71. The method claim 68, wherein the at least one additional spin includes at least one free spin.

72. The method claim 68, wherein the quantity of initial spins is determined at least in part based on the wager.

73. The method claim 68, wherein the designated second number of the first prize symbols necessary to be accumulated to win the first physical prize is at least in part based on the wager such that: (i) for a first wager made by the player, a first quantity of the first prize symbols is necessary to be accumulated to win the first physical prize, and (ii) for a second, different wager made by the player, a second, different quantity of the first prize symbols is necessary to be accumulated to win the first physical prize.

74. The method claim 68, wherein the designated third number of the second prize symbols necessary to be accumulated to win the second physical prize is at least in part based on the wager such that: (i) for a first wager made by the player, a first quantity of the second prize symbols is necessary to be accumulated to win the second physical prize, and (ii) for a second, different wager made by the player, a second, different quantity of the second prize symbols is necessary to be accumulated to win the second physical prize.

75. The method claim 68, wherein the number of prize symbols accumulated for each prize symbol which occurs on the reels is at least in part based on the wager.

76. The method claim 68, wherein the predetermined symbol combination is associated with a probability of occurring on the reels, and the probability is at least in part based on the wager.

77. The method of claim 68, wherein the steps (a) to (p) are controlled through a data network.

78. The method of claim 77, wherein the data network is an internet.

79. A method of operating a gaming device after a wager by a player, and for a single play of a game, said method comprising:

(a) after the wager by the player, start the single play of the game;

(b) causing at least one display device to display a plurality of reels and a plurality of symbols on the reels, said symbols including at least one first prize symbol, at least one second prize symbol and at least one re-trigger symbol;

(c) determining a quantity of free spins of the reels which will subsequently be displayed, the determined quantity of free spins being greater than one;

(d) designating a first number, said designated first number initially being equal to the determined quantity of free spins of the reels;

(e) designating a second number of the first prize symbols necessary to be accumulated to win a first physical prize;

(f) designating a third number of the second prize symbols necessary to be accumulated to win a second different physical prize, wherein the first physical prize is of higher value than the second physical prize; and (g) after an occurrence of a designated triggering event in association with the single play of the game:

(i) causing the at least one display device to display the designated first number;

(ii) for each one of the free spins of the reels:

(A) causing the at least one display device to display said reels spinning and stopping, and (B) reducing the displayed designated first number to indicate how many of the determined quantity of free spins remain to be subsequently displayed;

(iii) causing the at least one display device to display at least one additional free spin of the reels if a predetermined symbol combination including the re-trigger symbol occurs on the reels during the displayed free spins of the reels;

(iv) accumulating any first prize symbols which occur on the reels in each of said displayed free spins and the at least one additional free spin of the reels;

(v) accumulating any second prize symbols which occur on the reels in each of said displayed free spins and the at least one additional free spin of the reels;

(vi) awarding the first physical prize to the player if the accumulated number of first prize symbols reaches the designated second number of first prize symbols, wherein the re-trigger symbol or the predetermined symbol combination must occur on the reels at least once to accumulate the designated second number of first prize symbols;

(vii) awarding the second physical prize to the player if the accumulated number of second prize symbols reaches the designated third number of second prize symbols, wherein the re-trigger symbol or the predetermined symbol combination must occur on the reels at least once to accumulate the designated third number of second prize symbols; and (viii) causing the single play of the game to end, resetting the accumulated number of first prize symbols to zero and resetting the accumulated number of second prize symbols to zero.

80. The method of claim 79, which includes providing a higher probability of obtaining the second physical prize than the first physical prize.

81. The method of claim 79, wherein the quantity of free spins is determined at least in part based on the wager made by the player.

82. The method of claim 79, wherein the designated second number of the first prize symbols necessary to be accumulated to win the first physical prize is at least in part based on a wager made by the player such that: (i) for a first wager made by the player, a first quantity of the first prize symbols is necessary to be accumulated to win the first physical prize, and (ii) for a second, different wager made by the player, a second, different quantity of the first prize symbols is necessary to be accumulated to win the first physical prize.

83. The method of claim 79, wherein the designated third number of the second prize symbols necessary to be accumulated to win the second physical prize is at least in part based on a wager made by the player such that: (i) for a first wager made by the player, a first quantity of the second prize symbols is necessary to be accumulated to win the second physical prize, and (ii) for a second, different wager made by the player, a second, different quantity of the second prize symbols is necessary to be accumulated to win the second physical prize.

84. The method of claim 79, wherein the number of prize symbols accumulated for each prize symbol which occurs on the reels is at least in part based on a wager made by the player.

85. The method of claim 79, wherein the predetermined symbol combination is associated with a probability of occurring on the reels, and the probability is at least in part based on a wager made by the player.

86. The method of claim 79, wherein the steps (a) to (e) are controlled through a data network.

87. The method of claim 86, wherein the data network is an internet.

* * * * *

UNITED STATES PATENT AND TRADEMARK OFFICE

CERTIFICATE OF CORRECTION

PATENT NO. : 7,862,420 B2
APPLICATION NO. : 10/644310
DATED : January 4, 2011
INVENTOR(S) : Peterson et al.

It is certified that error appears in the above-identified patent and that said Letters Patent is hereby corrected as shown below:

In Claim 25, column 18, line 20, replace the ";" with a --,--.

In Claim 42, column 20, line 61, replace the ";" with a --,--.

In Claim 42, column 20, line 64, replace the ";" with a --,--.

In Claim 42, column 20, line 67, replace the ";" with a --,--.

In Claim 68, column 24, line 11, replace "(i)" with --(j)--.

In Claim 86, column 26, line 47, replace "(e)" with --(g)--.

Signed and Sealed this
Eighth Day of March, 2011

David J. Kappos
*Director of the United States Patent and Trademark Office*